United States Patent
Wollbrinck et al.

(10) Patent No.: US 9,261,434 B2
(45) Date of Patent: Feb. 16, 2016

(54) TIRE UNIFORMITY TESTING SYSTEM HAVING A TESTING STATION FOR CHANGING RIM SETS

(75) Inventors: James Wollbrinck, Carrollton, OH (US); Richard R. Matuszny, Strongsville, OH (US); Barry Cargould, Hudson, OH (US); Peter Williams, Fisher, IN (US)

(73) Assignee: Micro-Poise Measurement Systems, LLC, Streetsboro, OH (US)

( * ) Notice: Subject to any disclaimer, the term of this patent is extended or adjusted under 35 U.S.C. 154(b) by 178 days.

(21) Appl. No.: 13/885,850

(22) PCT Filed: Nov. 22, 2011

(86) PCT No.: PCT/US2011/061852
§ 371 (c)(1),
(2), (4) Date: May 16, 2013

(87) PCT Pub. No.: WO2012/071416
PCT Pub. Date: May 31, 2012

(65) Prior Publication Data
US 2013/0233067 A1    Sep. 12, 2013

Related U.S. Application Data

(60) Provisional application No. 61/416,575, filed on Nov. 23, 2010.

(51) Int. Cl.
*G01M 17/02* (2006.01)
*B60C 23/00* (2006.01)
(Continued)

(52) U.S. Cl.
CPC ............. *G01M 17/02* (2013.01); *B60C 25/002* (2013.04); *G01M 17/021* (2013.01); *Y10T 29/49815* (2015.01); *Y10T 29/49826* (2015.01)

(58) Field of Classification Search
None
See application file for complete search history.

(56) References Cited

U.S. PATENT DOCUMENTS

| 4,574,628 A | 3/1986 | Maikuma et al. |
| 4,763,515 A * | 8/1988 | Pielach et al. .................. 73/146 |

(Continued)

FOREIGN PATENT DOCUMENTS

| CN | 101038227 | 9/2007 |
| EP | 0138471 | 5/1989 |

(Continued)

OTHER PUBLICATIONS

PCT/US2011/061852 International Search Report & Written Opinion, completed Mar. 21 2012.

*Primary Examiner* — Peter Macchiarolo
*Assistant Examiner* — Jermaine Jenkins
(74) *Attorney, Agent, or Firm* — Tarolli, Sundheim, Covell & Tummino LLP

(57) ABSTRACT

An apparatus for changing rim sets at a testing station of a tire uniformity testing system that includes a storage unit for storing a plurality of rim set assemblies. A transfer arm is reciprocally movable and includes a gripper mechanism for gripping a rim set assembly and moving it from a storage position to a position at which rims forming part of the rim set assembly are aligned with opposed spindles at the testing station. The rim set assembly includes a bracket having structure engageable by the transfer arm and at least one of the rims forming part of the assembly includes a locking member rotatable between a first position and a second position. The bracket includes a structure for immobilizing the rim to inhibit relative rotation between the rim and the bracket and further includes a lever mechanism for moving the locking member from its first position to its second position in order to engage retaining members forming part of the bracket. The lever mechanism moves the locking member from its second position to its first position when the rim is aligned with an associated spindle in order to engage other retaining members forming part of the spindle. The rim is released from the bracket as the locking member moves to engage the other retaining members. After release, the bracket moves to a remote position spaced from the testing station. To remove the rim sets, the steps for attaching rims to the spindles are reversed in order to release the rims from the spindles while simultaneously engaging the bracket. The resulting rim set assembly is moved to a remote position defined by a storage unit that stores a plurality of rim set assemblies. The disclosed locking member and associated rim can be used to facilitate the manual installation of a test rim to a spindle.

28 Claims, 19 Drawing Sheets

(51) Int. Cl.
  *B60C 23/02* (2006.01)
  *B60C 25/00* (2006.01)

(56) References Cited

U.S. PATENT DOCUMENTS

| | | | |
|---|---|---|---|
| 4,763,710 A | 8/1988 | Pielach | |
| 4,971,128 A * | 11/1990 | Koga et al. | 127/21 |
| 5,052,218 A | 10/1991 | Iwama | |
| 5,107,702 A | 4/1992 | Iwama | |
| 5,107,703 A * | 4/1992 | Ota | 73/146 |
| 5,562,358 A * | 10/1996 | Okamoto | G01M 17/021 403/365 |
| 5,719,331 A * | 2/1998 | Delmoro | G01M 17/021 73/146 |
| 5,992,227 A * | 11/1999 | Jellison | G01M 17/021 73/146 |
| 6,089,084 A * | 7/2000 | Nishihara et al. | 73/146 |
| 6,131,455 A * | 10/2000 | Matsumoto | G01M 1/045 73/146 |
| 6,244,105 B1 * | 6/2001 | Nishihara et al. | 73/146 |
| 8,464,579 B2 * | 6/2013 | Nakayama et al. | 73/146 |

FOREIGN PATENT DOCUMENTS

| | | |
|---|---|---|
| EP | 0421827 A2 | 10/1991 |
| JP | 5-187952 | 7/1993 |

\* cited by examiner

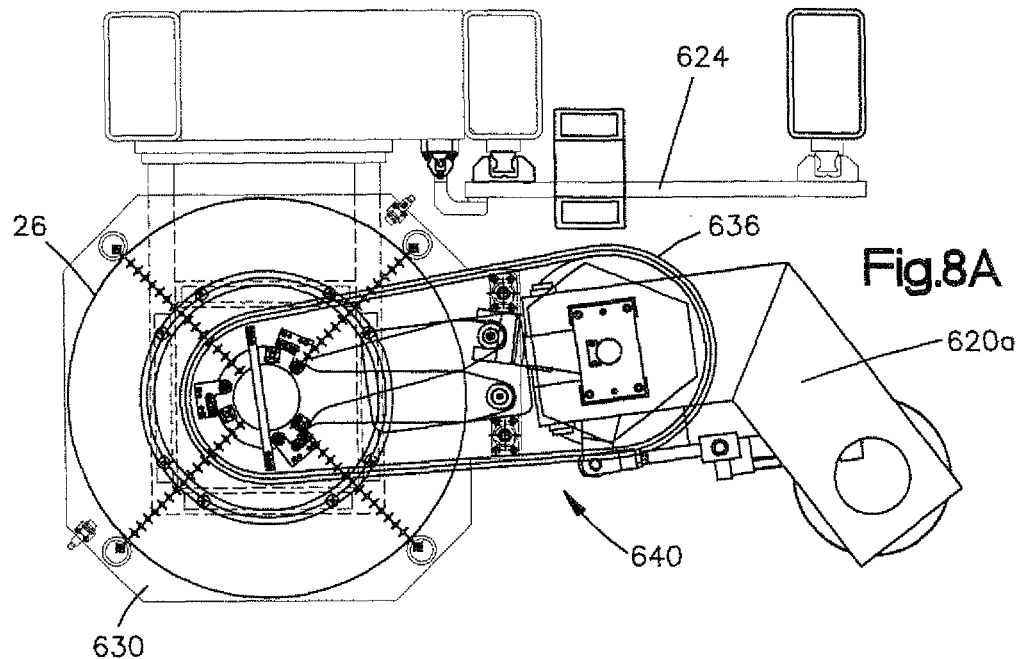
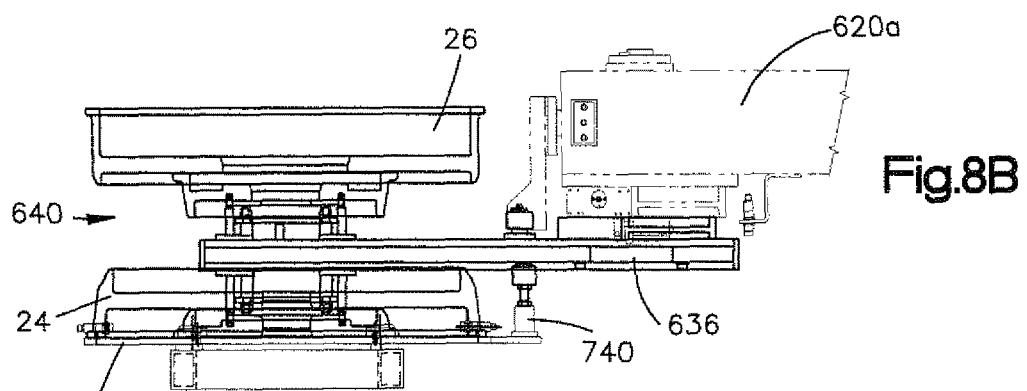
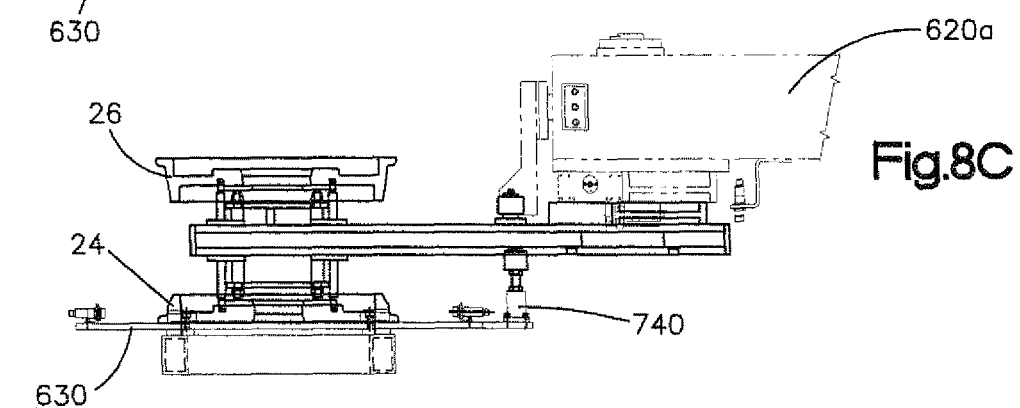

TIRE UNIFORMITY TESTING SYSTEM HAVING A TESTING STATION FOR CHANGING RIM SETS

CROSS REFERENCES TO RELATED APPLICATIONS

This application filed under 35 U.S.C. §371 is a national phase application of International Application Serial Number PCT/US2011/061852 filed Nov. 22, 2011, which claims priority to U.S. Provisional Application 61/416,575, filed Nov. 23, 2010.

TECHNICAL FIELD

The present invention relates generally to tire uniformity testing systems and, in particular, to a method and apparatus for automatically changing rim sets on a tire uniformity machine.

BACKGROUND ART

Tire uniformity testing systems are used throughout the tire manufacturing and automotive industries. These machines check tire uniformity parameters on manufactured tires. Many of the testing functions are fully automated. In particular, tires are fed by a conveyor to a tire testing station where they are clamped between tire rims, inflated and then placed in rolling contact with a loadwheel. At the conclusion of the test, the rims are separated and the tires are delivered to an exit location by another conveyor.

The rims that are used to clamp the tires at the testing station must be sized to fit the tire being tested. Accordingly, when the size of the tires that are being tested changes, the rim set must also be changed. In many systems, this is performed by the operator, sometimes with the aid of a lifting device. The changing of rims can be time-consuming and strenuous.

DISCLOSURE OF INVENTION

The present invention provides a new and improved tire uniformity testing system that includes a method and apparatus for facilitating the changing of rim sets at a testing station when the size of the tires being tested changes. In one disclosed embodiment, the present invention provides a method and apparatus for automatically changing rim sets at the testing station with little or no operator manipulation needed.

According to the one embodiment, the apparatus for changing rim sets at a testing station comprises a transfer arm that includes a gripper mechanism for gripping a rim set assembly and an actuator for moving the rim set assembly to a position at which a pair of rims forming part of the rim set assembly are aligned with opposed spindles at a testing station. According to the invention, the rim set assembly comprises a bracket having structure engageable by the transfer arm gripper mechanism. At least one of the pair of rims includes a locking member rotatably movable between a first position and a second position. The bracket includes structure for immobilizing the rim to inhibit relative rotation between the rim and the bracket. The locking member is movable from the first position to the second position in order to engage retaining members forming part of the bracket. According to this embodiment, at least one of the spindles includes other retaining members that are operatively engageable by the locking member of the rim when the locking member is moved from the second position to the first position. As the locking member is moved, it is coupled to the spindle while simultaneously being released by the bracket in order to secure the rim to the spindle.

According to a more preferred embodiment, another locking member is associated with the other rim and the bracket includes additional structure for immobilizing the other rim to inhibit relative rotation between the other rim in the bracket when bracket is placed in a abutting engagement with the other rim.

According to a preferred embodiment, a storage unit is provided that is capable of storing a plurality of rim set assemblies and wherein the transfer arm is mounted for reciprocating movement so that it can align itself and engage any one of a plurality of rim set assemblies. In the illustrated embodiment, the storage includes four vertically arranged shelves for storing four rim set assemblies. According to the illustrated embodiment, the structure for immobilizing a rim with respect to the bracket comprises at least one pin engageable with an associated opening in the rim.

According to the preferred and illustrated embodiment, the locking member held by a rim is moved from its first to its second position and from its second to its first position by a pivotally mounted lever operatively coupled to the locking member such that pivot motion in the lever arm produces rotation in the locking member. In the illustrated embodiment, movement in the lever arm is effected by an actuator forming part of the transfer arm.

According to a feature of the invention, the rim set assembly comprises a bracket including structure engageable by a transfer arm. At least one of the rims includes the locking member movable between a first and second position and the bracket includes structure for immobilizing the rim to inhibit relative rotation between the rim and the bracket. The rim set assembly further includes a mechanism for moving the locking member from the first position to the second position in order to engage retaining members forming part of the bracket and the locking member is movable from the second position to the first position in order to release the rim from the retaining members. In a preferred embodiment of the rim set assembly, the rims held by the bracket are coaxially aligned.

In the illustrated embodiment, the locking member comprises a pair of spaced apart rings, one of the rings engageable upon predetermined movement with a spindle forming part of the tire uniformity testing system, the other of the rings is engageable upon predetermined movement with the bracket. In the preferred embodiment, each one of the rims held by the bracket includes an associated locking member that is movable between the first and second positions. The mechanism for rotating the locking members between their two operative positions preferably comprises a lever which is mounted for pivotal movement having one end defining an axis of rotation that is coincident with the axes of rotation of the rims. The one end of the lever is operatively engaged with the locking member when the rims are held by the bracket. The other end of the lever arm is engageable by an actuator for producing pivotal motion in the locking lever.

According to a feature of the preferred rim set assembly, the bracket includes a movement inhibiting member that is engageable with the spindle forming part of the tire uniformity testing system which inhibits relative rotation between the spindle and the bracket. In a more preferred embodiment, the retaining members that are used to hold the rims to the brackets includes spring members for exerting a clamping force on the locking member. Preferably, the spring members comprise Belleville washers.

According to the invention, a method for changing rims on a tire uniformity testing system is disclosed which comprises the steps of releasably mounting a pair of rims to a bracket to form a rim set assembly. Engaging the rim set assembly and moving it into a predetermined testing station position at which the rims are positioned in axial alignment with the spindles forming part of the testing station. At least one of the spindles is moved in order to effect abutting engagement between each of the rims and an associated spindle. A lock mechanism is then operated which simultaneously releases at least one rim from the bracket while simultaneously engaging an associated spindle. After the rims are released from the bracket, the bracket is moved to a spaced position out of the testing station. In the preferred and illustrated embodiment, rims are removed from the spindles in the testing station by moving the bracket into alignment with the rims and moving at least one of the spindles in order to cause the rims to abutably engage the bracket. The locking members are then rotated to cause release of the rims from their associated spindles while simultaneously causing the rims to engage the retaining members forming part of the bracket. The spindles are then separated in order to provide clearance to allow the bracket with attached rims to move out of the testing station.

According to a feature of the invention, the disclosed method and apparatus can be used to facilitate the manual installation and removal of a rim from a spindle. In order to manually install a rim, the rim with attached locking member is positioned in alignment with the associated spindle and retaining members forming part of the spindle are allowed to pass through slotted openings in the locking member. The locking member is then rotated to cause slot segments of the slotted openings to engage the retaining members, thereby securing the rim to the spindle. In the preferred method, the retaining members are threaded and are rotated in order to increase the retaining force exerted by the retaining members on the locking member.

With the disclosed invention, the changing of rim sets on a tire uniformity testing system are greatly facilitated. By utilizing a rim set assembly that includes a bracket for holding a pair of rims, rim sets can be easily replaced at a testing station, thus reducing downtime for the tire uniformity testing machine and increasing its throughput.

Additional features of the invention will become apparent and a fuller understanding obtained by reading the following detailed description made with the accompanying drawings.

BRIEF DESCRIPTION OF DRAWINGS

FIG. 8A is a top plan view of the transfer arm and rim set assembly;

FIGS. 8B and 8C are side elevational views of the transfer mechanism and rim set assembly;

BEST MODE FOR CARRYING OUT THE INVENTION

Figure 1:
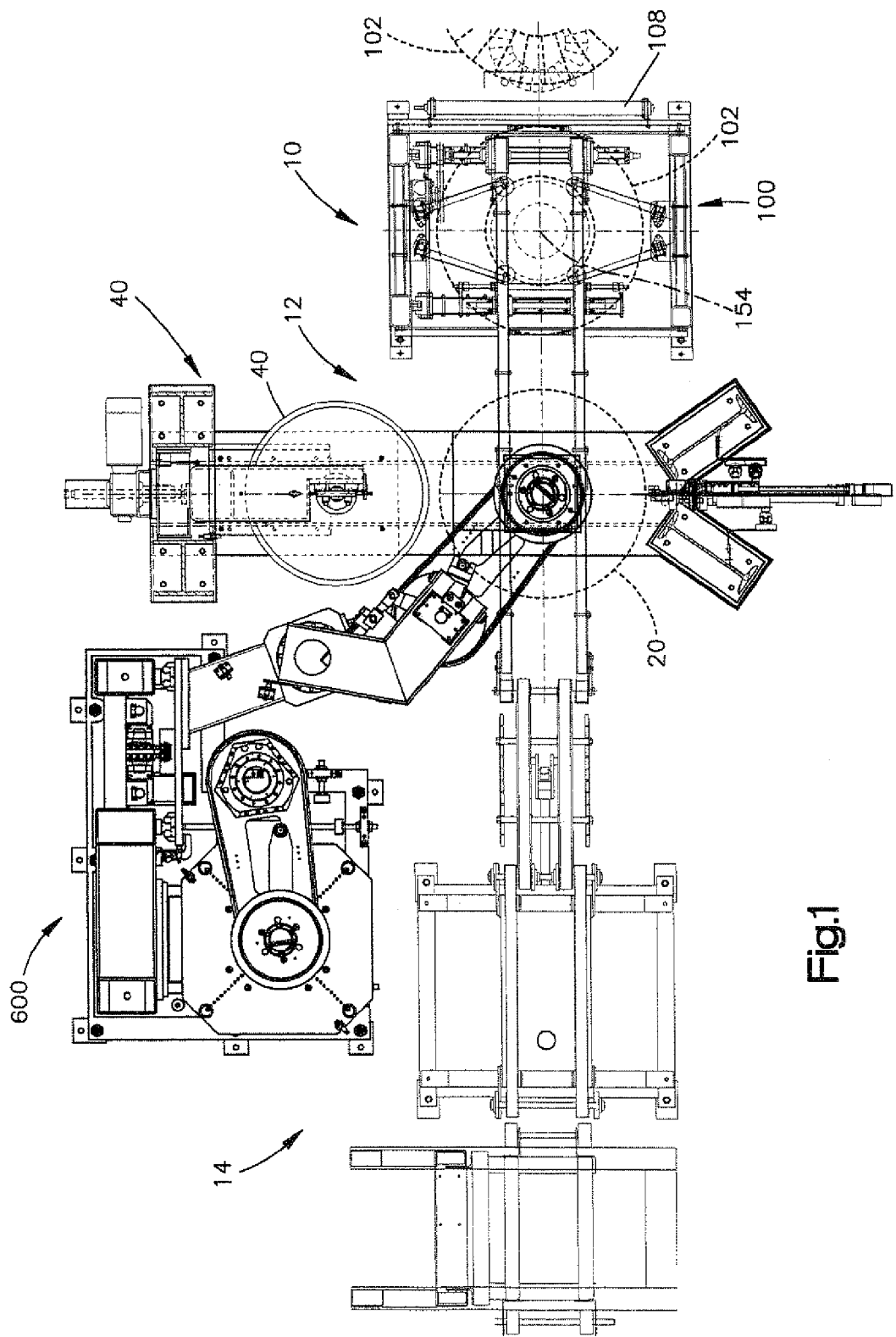
FIG. 1 is a top plan view of a tire uniformity testing system that includes a rim changing apparatus constructed in accordance with a preferred embodiment of the invention.
Figure 2:
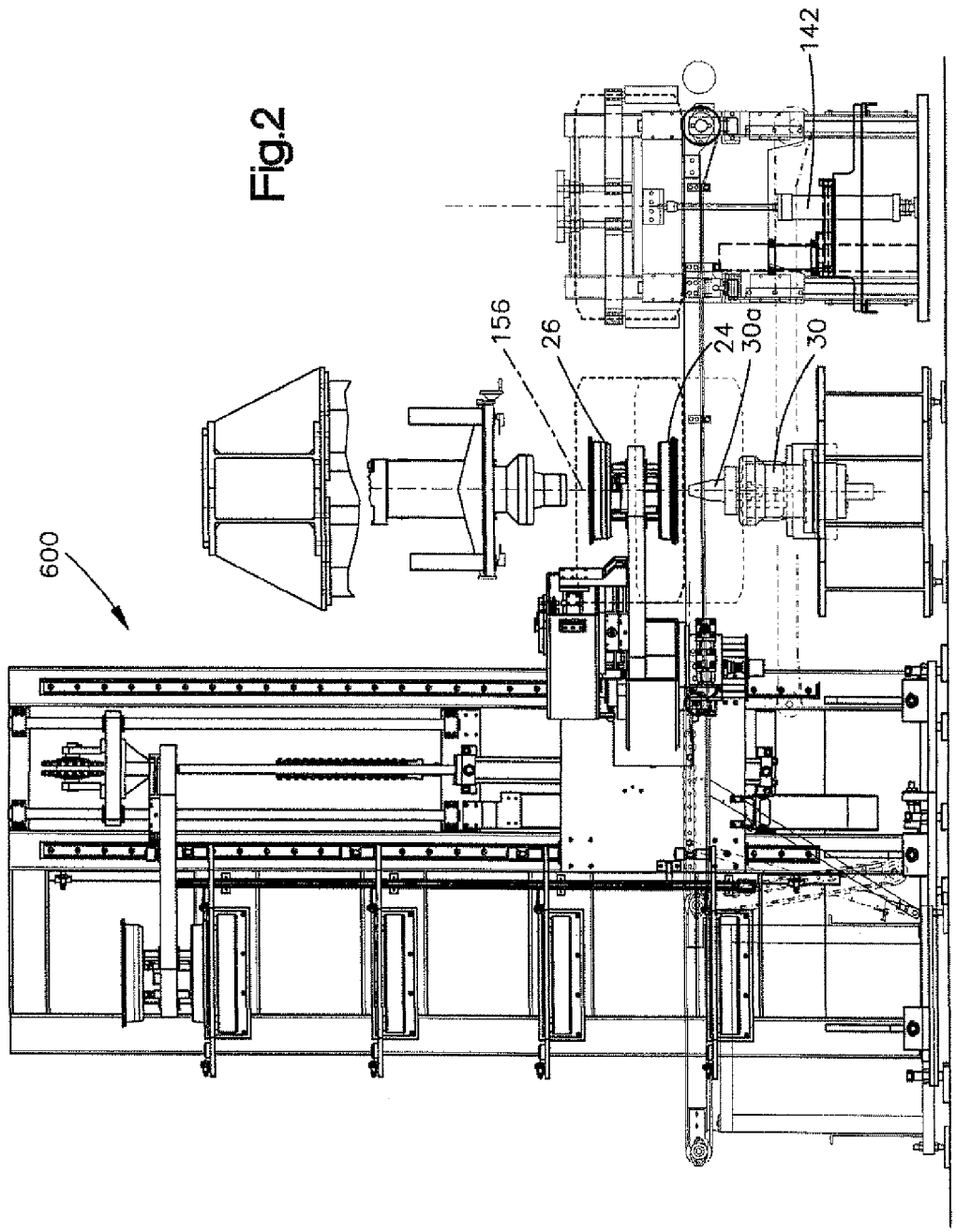
FIG. 2 is a side elevational view of a portion of the system shown in FIG. 1.

FIGS. 1 and 2 show the overall construction of a tire uniformity testing machine that includes an automatic rim change apparatus 600 constructed in accordance with a preferred embodiment of the invention. The tire uniformity machine of the type shown in FIGS. 1 and 2 is used to check tires for uniformity prior to shipment or prior to installation on a vehicle. The system shown in FIGS. 1 and 2 is virtually entirely automatic and receives tires from a centering station 10 and delivers tested tires to a delivery station 14.

FIG. 1 illustrates, in plan view, the overall arrangement of a tire testing system constructed in accordance with the preferred embodiment of the invention. Major subsystems include an inlet conveyer 10; a testing station 12; and, an exit module 14 which may include a marking station, as well as a tire sorting mechanism. A tire positioned at the testing station 12 is tested and optionally ground to adjust its roundness, uniformity and/or other desired physical properties.

Figure 3:
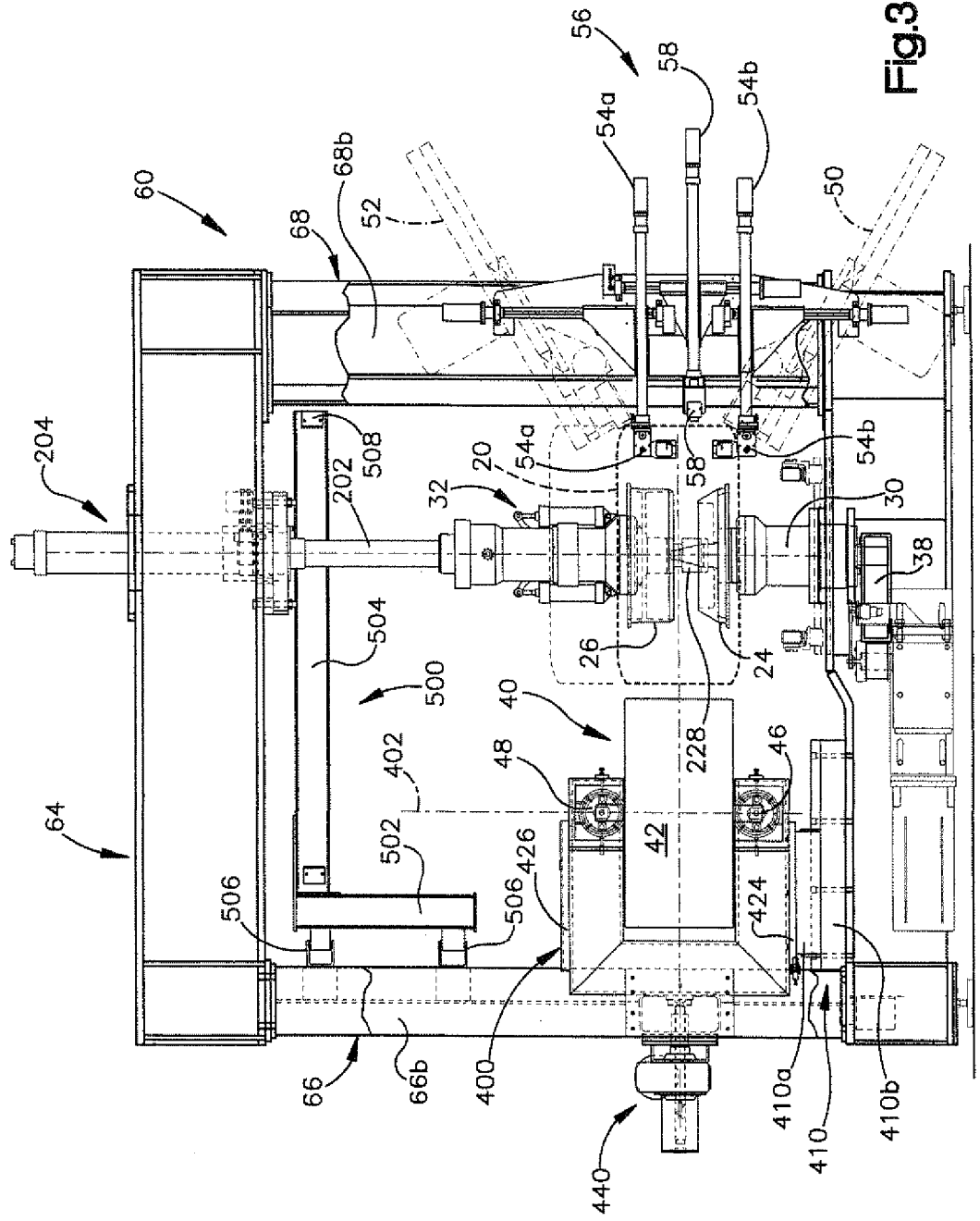
FIG. 3 is another side elevation view of a prior art portion of the testing system shown in FIG. 1.

Turning first to the tire testing station 12 and referring in particular to FIGS. 1 and 3, a tire, indicated in phantom by the reference character 20, is delivered to the testing location by the inlet conveyer/centering station 10 which preferably delivers the tire to a position at which an axis of the tire is coincident with a rotational axis of a pair of confronting rims 24, 26 (shown best in FIG. 3) forming part of the testing station and between which the tire 20 is clamped. The lower rim 24 (shown best in FIG. 3) is attached to and forms part of a spindle assembly 30. The upper rim 26 forms part of a reciprocally movable chuck assembly/spindle 32.

The spindle assembly 30 is rotatably driven by a drive motor (not shown) via a toothed belt indicated schematically in FIG. 3 by the reference character 38. After the tire is clamped between the upper and lower rims 26, 24, it is inflated by an inflating mechanism which communicates air to the interior of the tire by way of the spindle assembly 30. After inflation, a loadwheel assembly 40, including a rotatable loadwheel 42, moves into abutting engagement with the tire 20. As is conventional, the tire is rotated against the loadwheel and loads exerted on the loadwheel are monitored via load cells 46, 48 (FIG. 3). The data taken from the load cells determines the uniformity of the tire. If desired, adjustments to the uniformity are made by one or more grinders, such as the grinders indicated generally by the reference characters 50, 52 for grinding the lower and upper portions of the tire (as viewed in FIG. 3) and a grinder (not shown) for grinding the center portion of the tire.

Referring in particular to FIGS. 1 and 2, the inlet conveyor is best shown. The inlet conveyor is more fully disclosed in U.S. Pat. No. 6,082,191 and entitled INLET CONVEYOR FOR TIRE TESTING SYSTEMS, the subject matter of which is hereby incorporated by reference.

Inlet conveyor 10 is operative to convey tires to be tested from a centering station indicated generally by the reference character 100 to the testing station 12. In operation, a tire to be tested is delivered to the entrance of the centering station 100 by a belt or roller conveyor (not shown). FIG. 1 illustrates a tire, indicated in phantom by the reference character 102, about to be delivered to the inlet conveyor. The inlet conveyor includes a feed roll 108 which moves the delivered tire onto the inlet conveyor mechanism.

The centering arms are then moved outwardly to their retracted positions. The tire to be tested is now supported by the conveyor unit, is centered with respect to the axis 154 and is a predetermined distance from the axis 156 of the spindle 30. The conveyor actuator 190 is then actuated to advance the tire a predetermined distance which positions the tire coincident with the axis 156 of the spindle 30 (see FIG. 2).

The actuator 142 is then energized to lower the conveyor unit which, in effect, lowers the tire onto the spindle 30. Normally, the conveyor would then be reverse actuated to return the drive belts to their starting positions. While the conveyor unit is in the lower position, another tire may be brought into the centering station and subsequently lubricated and centered during the time a tire is being tested at the testing station 12.

As indicated above, a tire to be tested is held at the testing station 12 between a spindle assembly 30 fixed to the frame 60 (FIG. 3) and a reciprocally movable chuck assembly 32 mounted to a cross beam 64 of the frame 60. The spindle and chuck assemblies are more fully disclosed in U.S. Pat. No. 5,992,227 and entitled AUTOMATIC ADJUSTABLE WIDTH CHUCK APPARATUS FOR TIRE TESTING SYSTEMS, the subject matter of which is hereby incorporated by reference.

Referring to FIG. 3 in particular, the chuck assembly 32 is mounted to the end of a hydraulic ram 202 forming part of a hydraulic actuator 204. The actuator is secured to the frame cross beam 64 by suitable fasteners (not shown). When a tire is to be tested and positioned at the testing station, the actuator 204 extends the ram 202 to move the chuck assembly 32 towards the spindle assembly 30. The chuck assembly 32 which mounts the upper tire rim 26 also includes a centrally positioned alignment member 228 which includes a tapered opening configured to receive a cone member 30*a* (FIG. 2) forming part of the spindle assembly 30. The alignment member 228 may be termed a "nose cone". The engagement between the alignment member 228 and the cone member 30*a* maintains precise alignment between the chuck assembly 32 and the spindle assembly 30 and, along with the tire clamped between the assemblies, is the means by which rotation of the spindle assembly 30 is transferred to the upper rim 26 of the chuck assembly, thereby causing upper and lower rims 26, 24 to rotate in unison when a tire is clamped between the chuck assembly 32 and spindle 30.

Additional details of other aspects of the tire testing system can be found in U.S. Pat. No. 6,016,695, which is hereby incorporated by reference.

As described above, a tire to be tested is clamped between upper and lower rims 24, 26. Rim 24 is connected to and driven by a lower spindle 30 whereas rim 26 is rotatably mounted to the upper spindle/chuck assembly which includes a mechanism for raising and lowering the rim 26 towards and away from a tire located in the testing station. The upper rim 26 is lowered a predetermined distance to sealingly engage the tire which is then inflated and tested. At the conclusion of the test, the upper rim 26 is raised to release the tire, allowing it to exit the machine as more fully explained in the above-identified U.S. patent.

The rims 24, 26 are designed to fit a particular tire size. When the size of the tires to be tested is changed, the rims 24, 26 must also be changed. In the tire testing system disclosed in the '695 patent, the rims are manually changed by an operator or operators who physically unfasten the rims from their respective spindles and reinstall rims of a different size. This task can be time-consuming and may require the use of a lifting apparatus, at least for the larger rims, which can be quite heavy.

According to the invention, a pick and place apparatus 600 is provided, that is operative to remove the upper and lower rims from the upper and lower spindles 32, 30 and replace them with rims of a different size, when the tire size being tested changes.

Figure 4A:
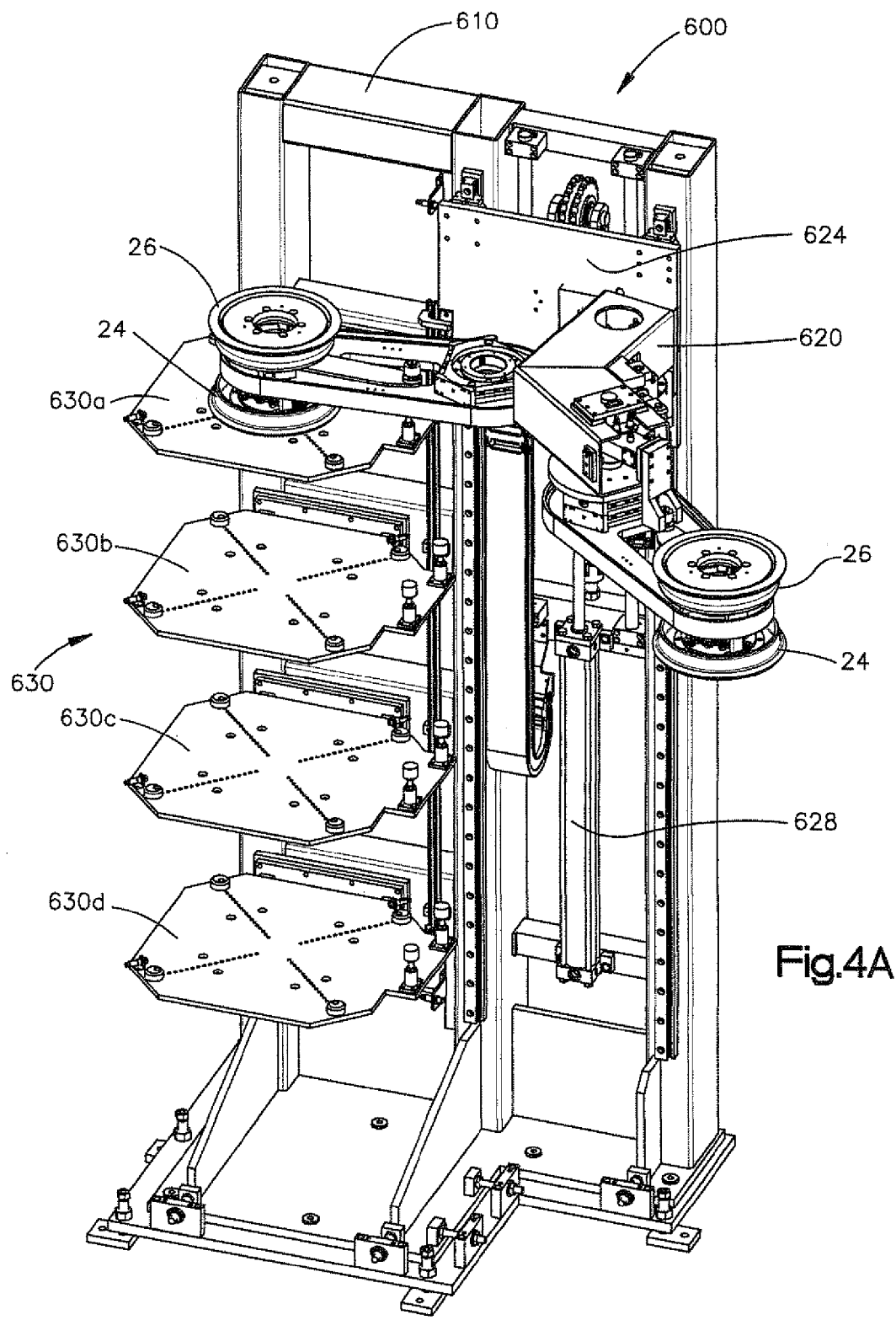
FIG. 4A is a perspective view of a rim changing mechanism constructed in accordance with the preferred embodiment of the invention and forming part of a system shown in FIG. 1.
Figure 4B:
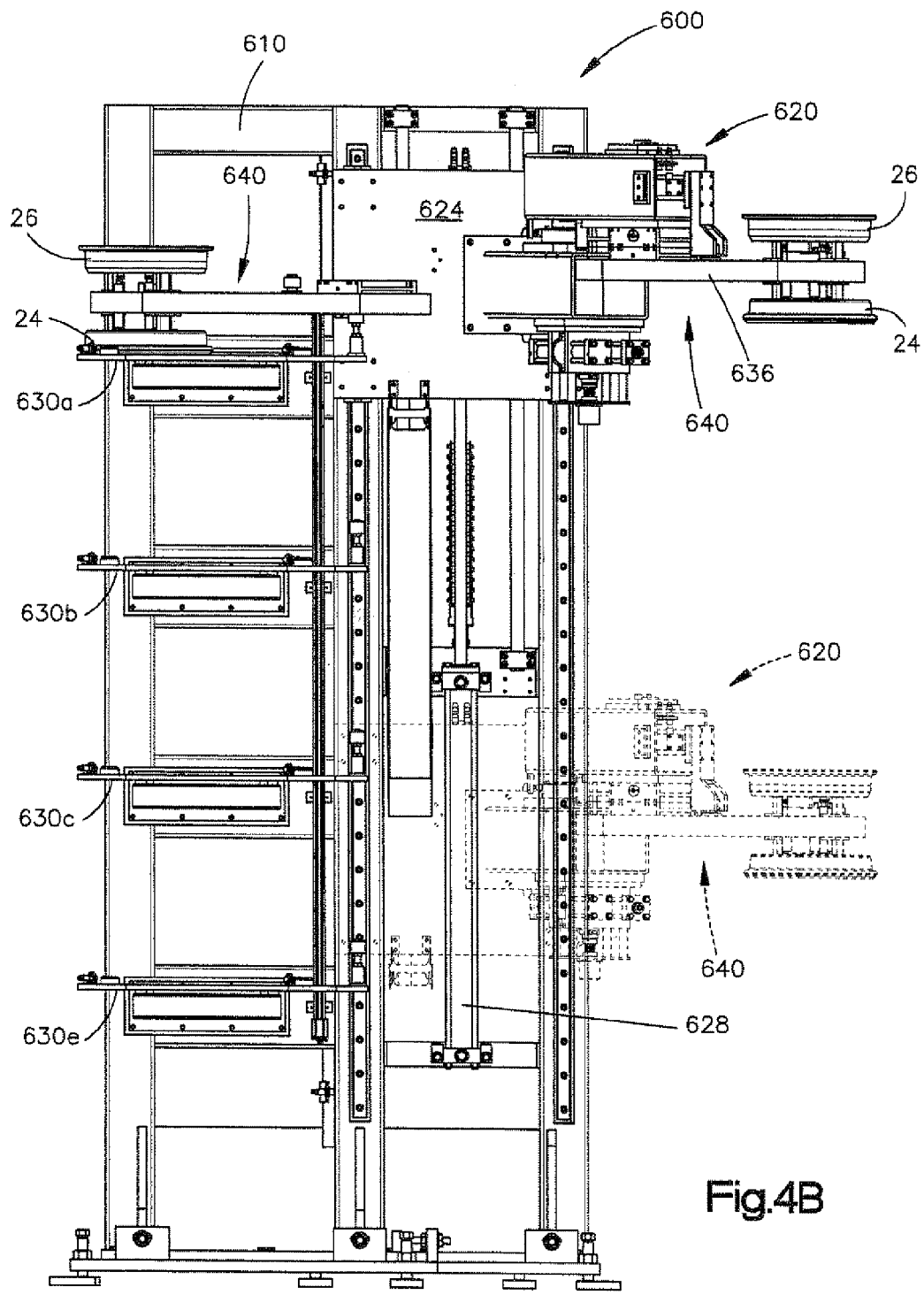
FIG. 4B is a side elevational view of the rim changing mechanism shown in FIG. 4A.

Referring also to FIGS. 4A-4B, the automatic rim change mechanism includes a storage unit 610, including a plurality of shelves 630 which in the illustrated embodiment, can store four rim sets. The storage unit includes a transfer mechanism 620 which is attached to an elevating mechanism 624, including a fluid pressure operated actuator 628, by which the transfer mechanism 620 is raised and lowered with respect to support shelves 630*a*, 630*b*, 630*c*, 630*d* on which rim sets are stored.

Figure 5:
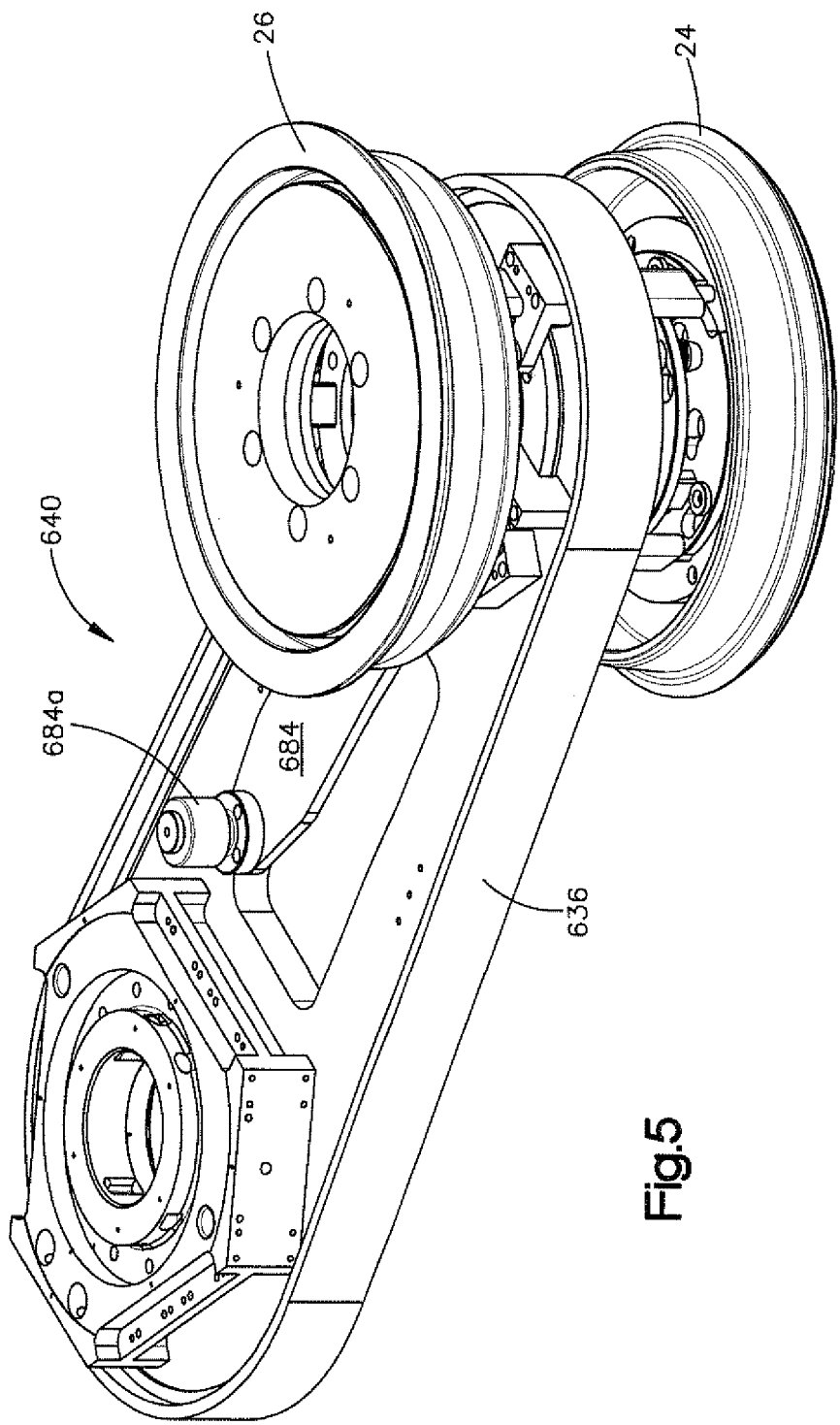
FIG. 5 is a perspective view of a rim set assembly constructed in accordance with a preferred embodiment of the invention.

According to the invention and shown best in FIG. 5, the upper and lower rims 26, 24 are releasably coupled to a bracket 636 to form a rim set assembly 640. The bracket 636, with associated rims attached, is stored on an associated shelf. When a rim set is to be installed to the upper and lower spindles of the tire testing station, the transfer mechanism 620 is moved into predetermined alignment with a rim set assembly 640 and engages the bracket 636. The transfer mechanism 620 then lifts the rim assembly 640 off its associated storage shelf and in a substantially pivotable motion moves the upper and lower rims into axial alignment with the upper and lower spindles 26, 24 (the spindles rotate on a common axis 156 shown in FIG. 2).

In the preferred installation method, the transfer mechanism/arm 620 is lowered until the lower rim abutably engages the lower spindle 30. The upper spindle/chuck assembly 32 is lowered until it abutably engages the upper rim. Once in this position, a lock mechanism (to be described) is operated to simultaneously release the upper and lower rims from the bracket 636 and cause them to engage structure on the upper and lower spindles which secure the upper and lower rims 26, 24 to the upper and lower spindle members 32, 30, respectively.

To remove and/or replace the rim set installed at the testing station, the upper spindle is raised to separate the upper and lower rims. The transfer mechanism 620 then pivots an empty bracket 636 into axial alignment with the rims 26, 24 and is lowered to abutably engage the lower rim 24. The upper rim 26 is lowered by the upper spindle 32 until it, too, abutably engages associated structure on the upper side of the bracket 636. The locking mechanism (to be described) is then actuated to simultaneously release the rims 24, 26 from their respective spindles 30, 32 and secure them to the bracket 636. The upper spindle 32 is then raised to allow clearance to raise the bracket 636 and attached brim set, which is then rotated by the transfer mechanism 620 to place the rim set assembly 640 on an associate shelf, i.e., shelf 630a.

Figure 5A:
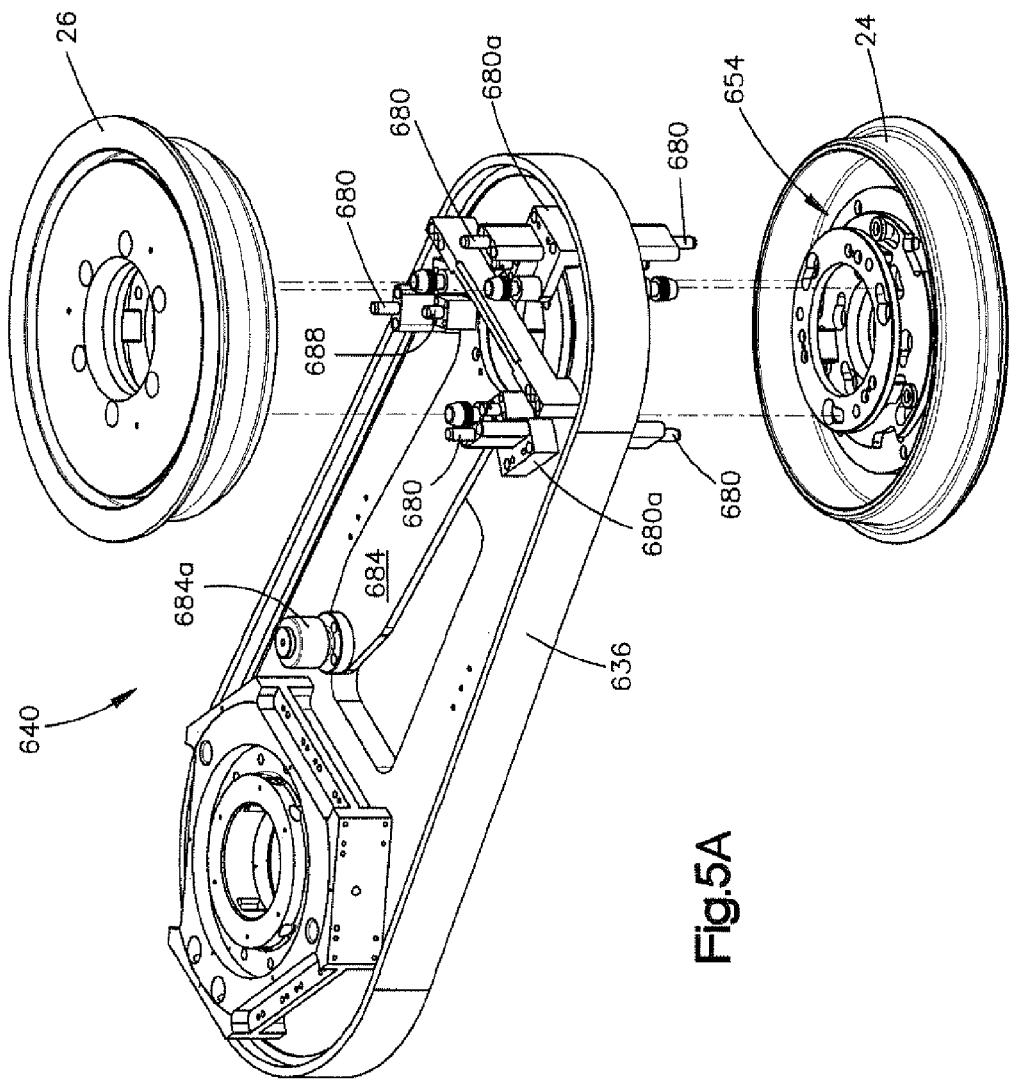
FIG. 5A is an exploded view of a rim change assembly.
Figure 5B:
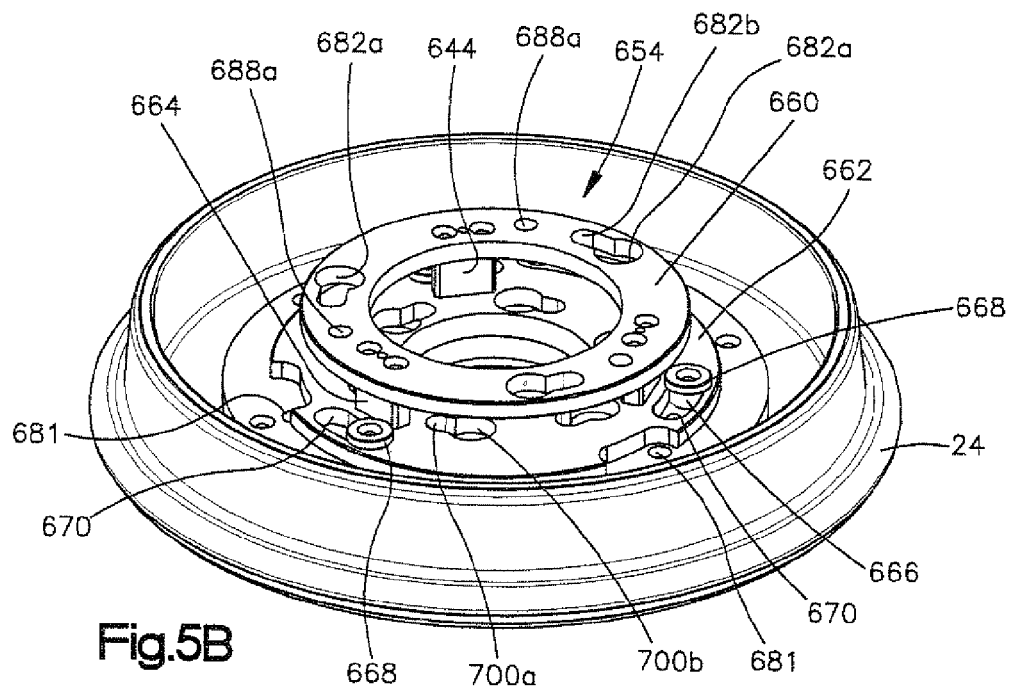
FIGS. 5B and C are perspective and plan views of a rim assembly, including a locking member constructed in accordance with a preferred embodiment of the invention.
Figure 5C:
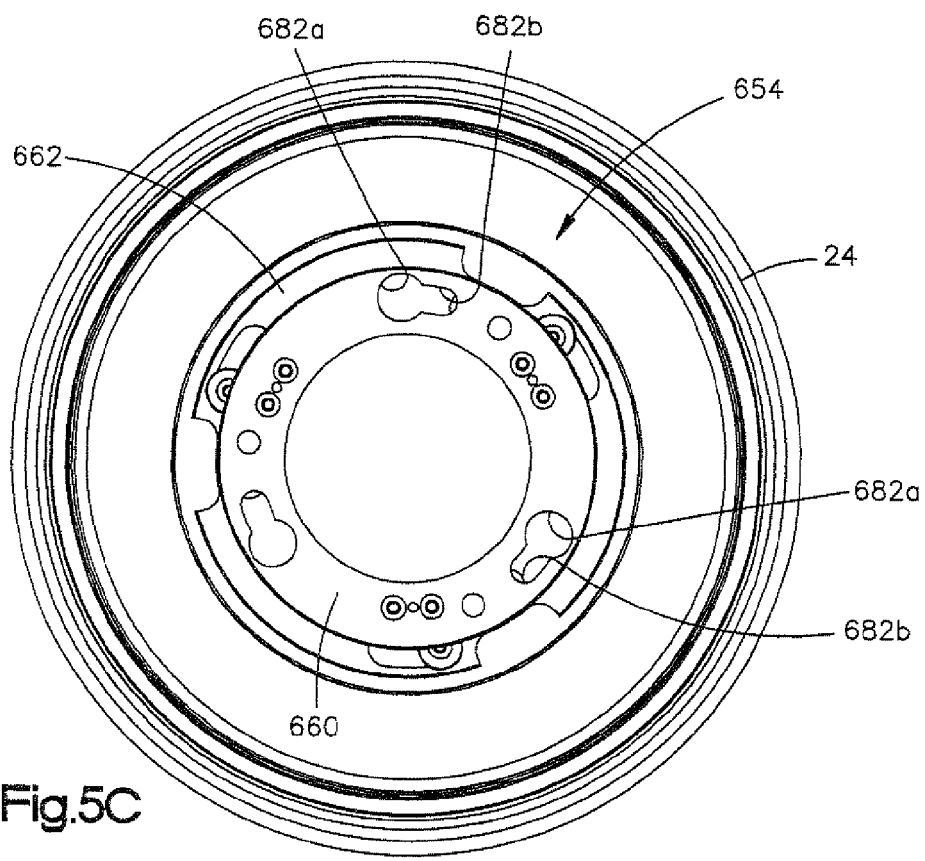

FIG. 5 illustrates a rim set assembly 640 which includes the bracket 636 and upper and lower rims 24, 26 releasably secured to the bracket. According to the invention, the rims 24, 26 include associated locking members 654, which are rotatably secured to the rims 24, 26 in a way that allows them to rotate through a predetermined angle of rotation, such as 15°. The locking members 654 coupled to the rims 24, 26 are substantially identical. There may be slight differences in actual details, but the principles of operation for the locking ring associated with rim 24 and the locking ring associated with rim 26 are the same. FIGS. 5A, 5B and 5C show the locking member 654 associated with the rim 24. The locking member 654 associated with the upper rim 26 is shown in FIG. 6B. The locking member 654 associated with the rim 26 is functionally the same and any description made with regard to the member 654 shown in combination with the rim 24 applies to the member 654 associated with the rim 26.

Each locking member 654 comprises a pair of spaced-apart rings 660, 662, one of which is engageable by structure on the bracket 636, the other of which is engageable by structure formed on an associated spindle. The rings 660, 662 are rigidly interconnected by spacers 664. As best seen in FIG. 5B, the locking member 654 is held to its associated rim 24 by a roller 666 and cap or keeper 668 arrangement that ride in associated slots 670 form in the ring 662. The cap 668 prevents separation of the ring 662 from the associated rim 24, while allowing rotational movement between the locking member 654 and the rim 24, the extent of which is determined by the length of associated slots 670.

The upper ring 660, as viewed in FIG. 5B, is engageable with structure formed on the bracket 636. The structure carried by the bracket 636 for engaging the locking member 654 forming part of the rim 24 is substantially the same as the engagement structure carried by the bracket 636 for engaging the locking member 654 forming part of the upper rim 26. FIG. 6A fully illustrates the engagement structure carried by the bracket 636 for engaging the upper rim 26. FIG. 6B shows the locking member 654 carried by the upper rim 26 and also shows the engagement structure carried on the underside of the bracket 636 which engages the locking member 654 carried by the lower rim 24. For purposes of explanation, it should be assumed that the engagement structure carried on the underside and upperside of the bracket 636, as viewed in FIGS. 6A and 6B is substantially the same.

Engagement of the rims 24, 26 with the bracket structure is achieved by rotating the locking members 654 associated with the rims 24, 26 a predetermined amount, which is determined by the length of the slots 670. The structure for engaging the upper and lower rims 24, 26 that are mounted on the upper and lower surfaces of the bracket, are substantially similar. Referring to FIG. 5A, the bracket 636 includes a plurality of rim locking pins 680 that are rigidly mounted to the bracket 636. In particular, the preferably tapered pins 680 are arranged in a circumferentially spaced relationship by associated mounting blocks 680a. Substantially similar pins 680 and blocks 680a are mounted to the underside of the bracket 636 shown in FIG. 5. When the bracket is moved into abutting contact with an associated rim, i.e., 24, the locking pins 680 enter associated bores 681 formed in an associated rim, i.e., rim 24 (see FIG. 5B). The pins 680 inhibit relative rotation between a rim and the bracket 636.

Figure 6:
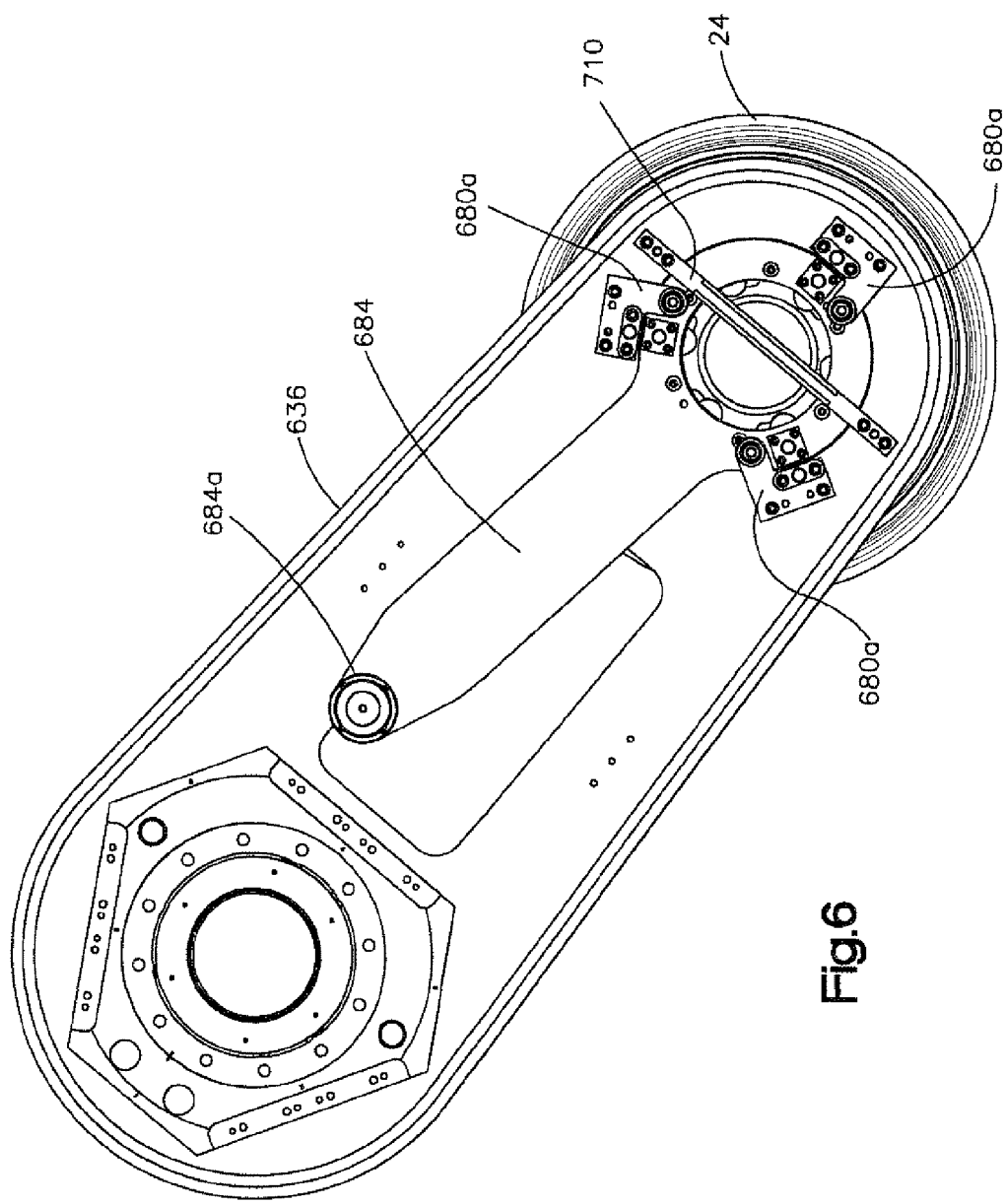
FIG. 6 is a top plan view of a portion of the rim set assembly.
Figure 6A:
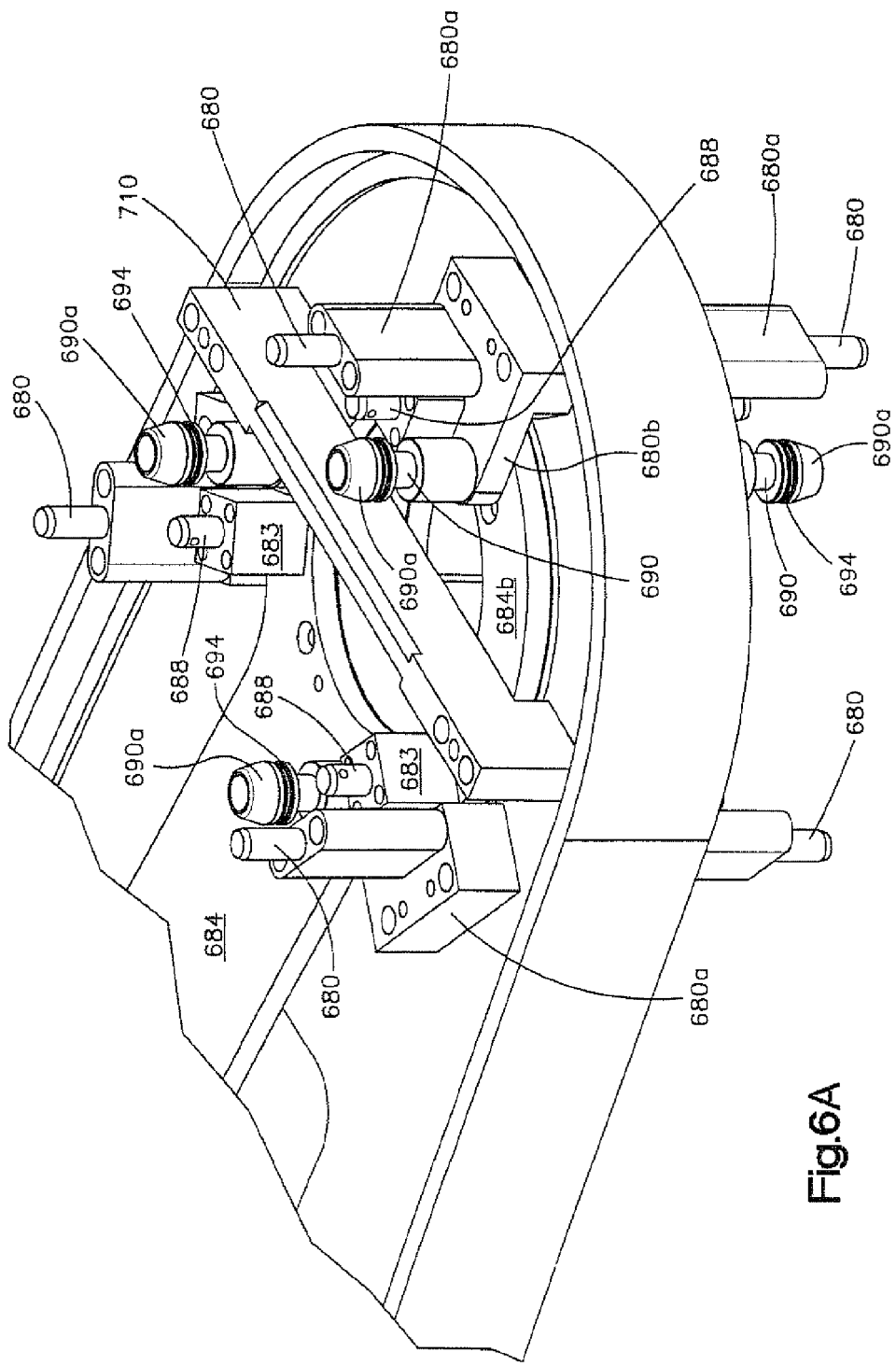
FIG. 6A is a fragmentary perspective view of a portion of a bracket that forms part of the rim set assembly shown in FIG. 5.
Figure 6B:
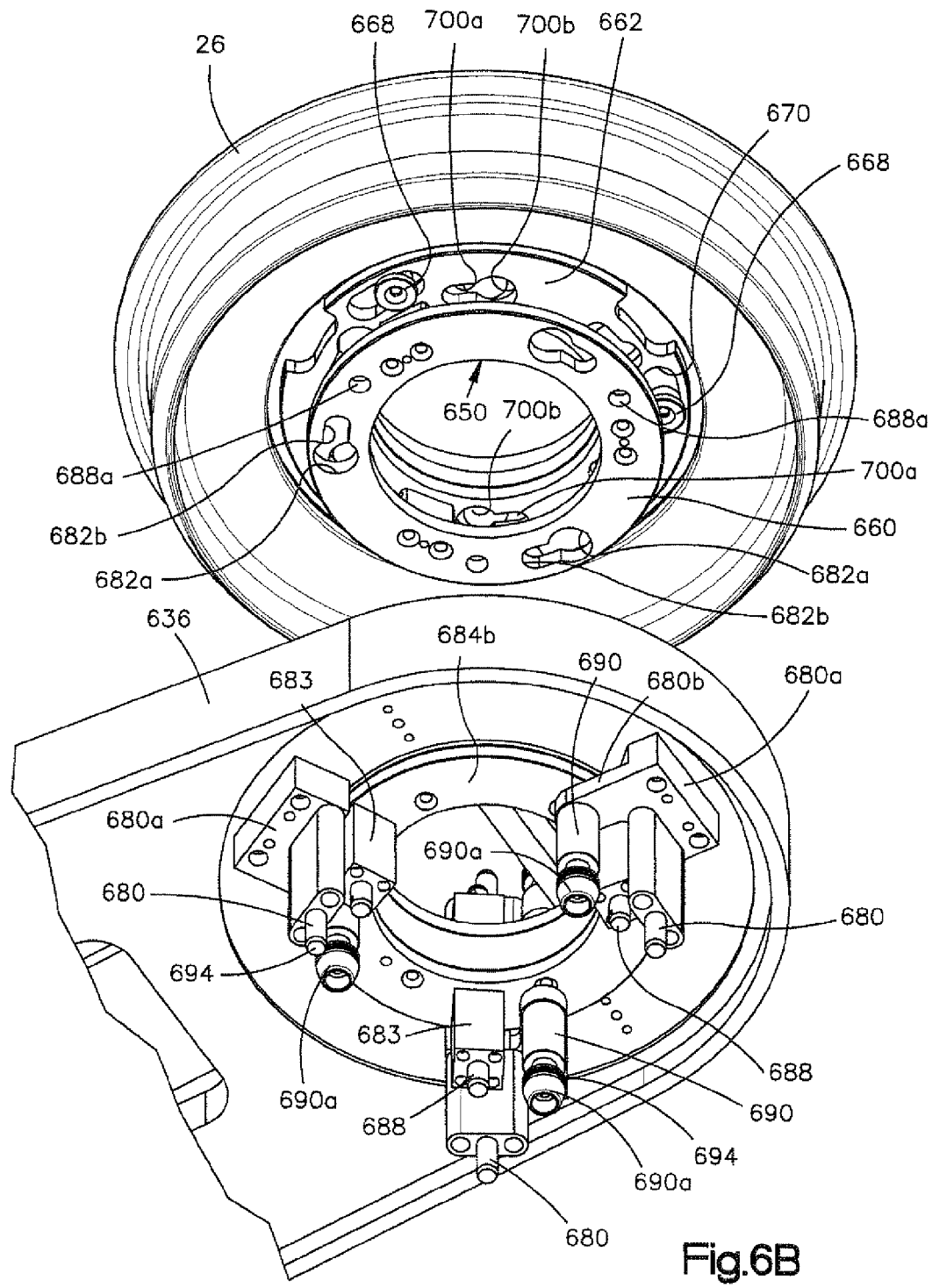
FIG. 6B is a fragmentary perspective view of the underside of an upper rim and a portion of the underside of the bracket.

Referring to FIGS. 5A, 6, and 6A, the bracket 636 rotatably supports a lever arm 684, including a cam roller 684a. The end of the lever arm opposite the cam roller carries a plurality of circumferentially-spaced actuating pins 688 carried by blocks 683 attached to an annular portion 684b of the lever arm 684 and which move with the lever arm 684. A plurality of circumferentially-spaced rim retaining studs 690 are also rigidly attached to the bracket 636, preferably by the same block structure 680a that mounts the pins 680.

Referring to FIG. 6A, each locking or retaining stud 690 is mounted to an associated lateral extension block 680b which forms part of the overall mounting block 680a. As seen in FIG. 6A, the extension block 680b overlies a portion of the annular section 684b of the lever arm 684. A clearance is provided between the underside of the extension block 680b and the annular section 684b so that movement of the lever arm is not inhibited. The extension blocks 680b, however, capture the annular portion 684b of the lever arm 684 and maintain its operative position on the bracket 636. As seen in FIG. 6B, an annular section 684b of the lever arm is also loosely captured by extension blocks 680b mounted to the underside of the bracket 636. The annular sections 684b located on the top surface and lower surface of the bracket 636 are interconnected by a hub section 684c (best shown in FIG. 6B), The hub 684c is rotatably supported in a suitably sized hole formed in the bracket 636.

To couple the rims 24, 26 to the bracket 636, the lever arm 684 is first moved to a rim release position. The bracket 636 is then moved downwardly by the transfer mechanism 620 into contact with the lower rim 24. In this position, the actuating pins 688 enter bores 688a of the upper ring 660. The locking studs 690 concurrently enter enlarged openings 682a also formed on the ring 660. The enlarged heads 690a of the studs pass through the ring until a Belleville or spring washer 694 held by the enlarged head is below or level with an associated ramp surface formed on the underside of the ring 660, as viewed in FIG. 5B. The upper spindle 32 is then lowered so that the upper rim 26 and associated locking ring 654 engages the same associated structure on the upper side of the bracket 636. Substantially similar locking pin openings 681 in the rim 26 receive the ring locking pins 680 to prevent relative rotation between the rim 26 and the bracket 636. The locking studs 690 mounted to the upper side of the bracket 636 enter associated openings 682a in the locking member 654 forming part of the upper rim. The lever arm is then actuated to move it from its rim release position to its rim engagement position which causes the locking members 654 of the upper and lower rims 24, 26 to rotate so that the retainer studs 690 move into the slot segments 680b and cause the associated spring washers 694 to engage the inside surface of the rings 660 thereby securing the locking member 654 and, thus, the associated rim, to the bracket 636.

The lower ring 662, as viewed in FIG. 5B of each locking member 654, includes a plurality of equally-spaced slots and openings 700a, 700b. Each slot 700a includes the enlarged diameter portion 700b through which an enlarged portion 695a of a locking stud 695 forming part of the spindle can pass. Referring to FIG. 9B, each spindle includes a plurality of these locking studs 695 and associated Belleville or spring washers 697 for clamping the ring 660 to a spindle. It should be noted that, as seen best in FIGS. 5B and 6B, the orientation of the spindle engagement slots 700a in ring 662 are oriented in a direction opposite to that of the slots 682b in the ring 660. As a result, when the lever arm 684 is operated to move the locking member 654 to a position at which it is engaged by the bracket 636, that movement substantially releases the locking member 654 from its associated spindle. When the lever arm 684 is moved in an opposite direction, the locking member 654 is released by the bracket 636 while it simultaneously engages the retaining studs 695 forming part of its associated spindle.

In the preferred embodiment, the rims 24, 26 are inhibited from rotating during the locking and unlocking operation. As noted above, the lower rim is attached to a power-driven spindle 30 which, when not powered, resists rotation. The upper spindle 32, however, is freely rotatable. In order to inhibit rotation of the upper spindle, the upper side of the bracket 636, as best seen in FIG. 6A, includes a locking, cross bar 710 rigidly secured to the upper surface of the bracket 636. In the preferred embodiment, the upper spindle is rotated into predetermined alignment with this bar prior to a rim change operation. In this predetermined aligned position, a slot 710a formed at the end of the spindle 32 is aligned with the bar 710 so that when the spindle is lowered the cross bar 710 enters the slot and inhibits rotation of the upper spindle 32.

FIGS. 7A-7D illustrate details of the transfer mechanism 620 and the method by which it engages a rim assembly 640. As seen best in FIGS. 7A and 7B, the transfer mechanism includes a transfer arm mount 720 attached to the elevator plate 624. The mount 720 mounts the transfer arm for rotation about a vertical axis. Movement of the transfer arm 620a in order to move a rim set assembly 640 from a stowed position to a spindle engagement position is produced by a rotary actuator indicated generally by the reference character 724 which is secured to the underside of the mount 720. The rotary actuator is of known construction and is available from Parker Hannifin under mfg. #HTR30-1403C-CG61-C-1. A shaft (not shown) is rotated by the actuator 724 which, in turn, is attached to the arm 620a and thus produces pivotal motion in the arm 620a, depending on the direction of actuation of the rotary actuator 724.

Figure 7A:
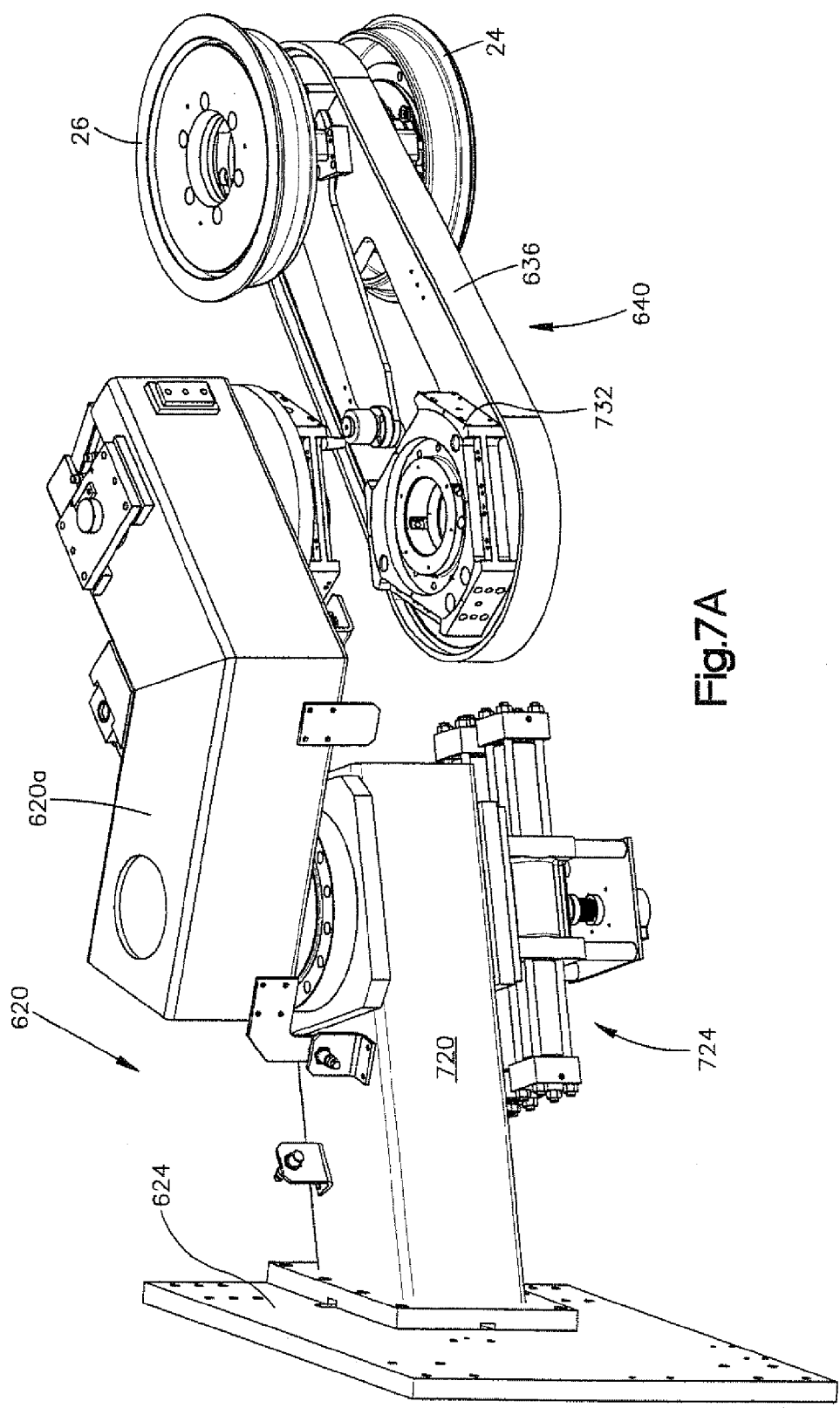
FIG. 7A-7D are perspective view of a transfer arm and rim set assembly and associated arm rotating mechanism.
Figure 7B:
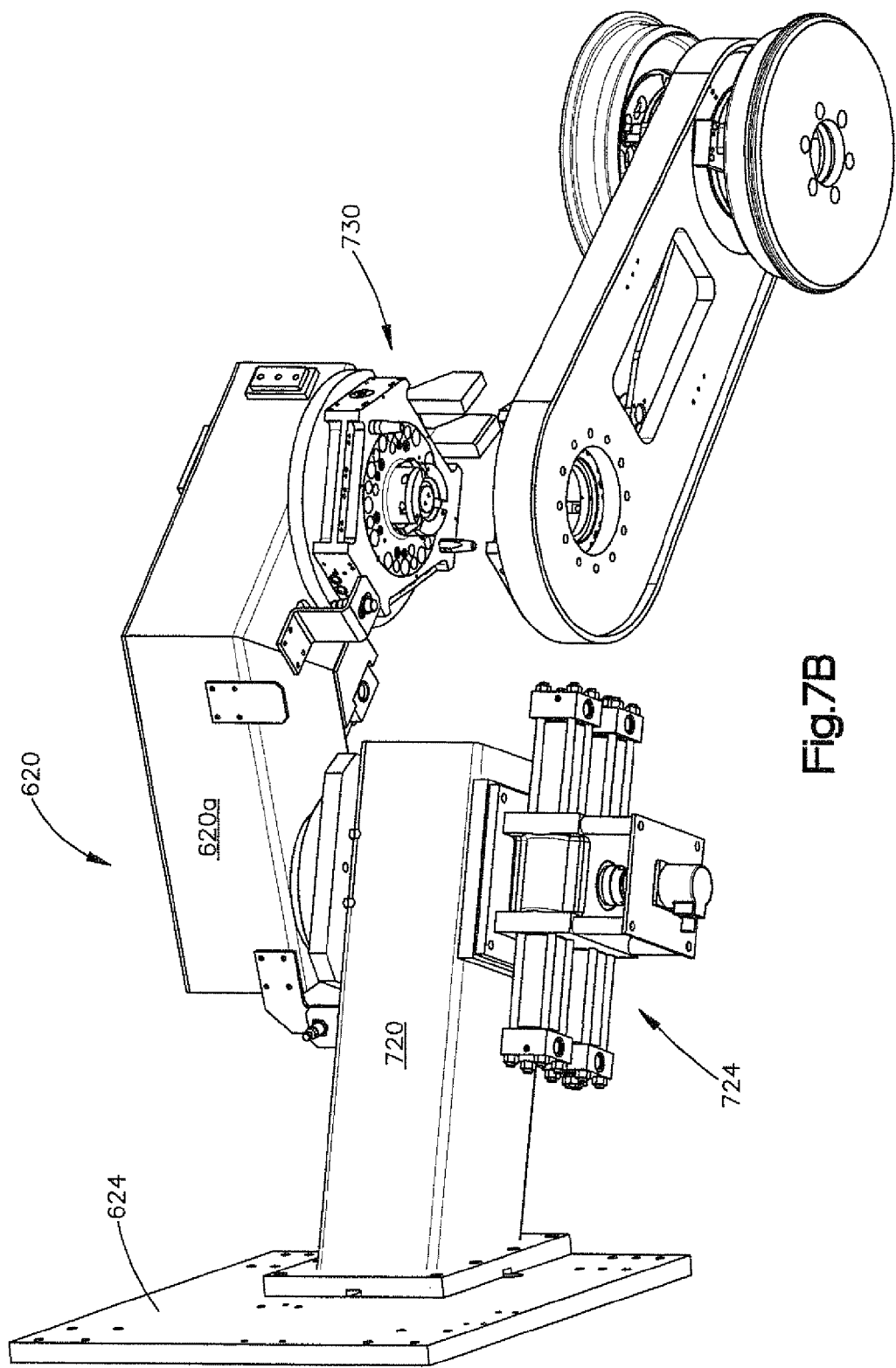
Figure 7C:
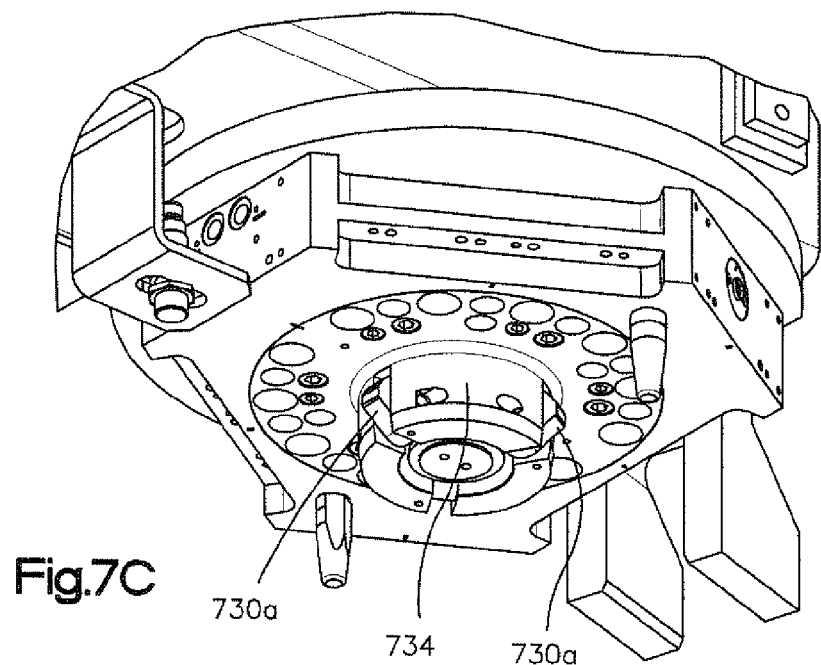
Figure 7D:
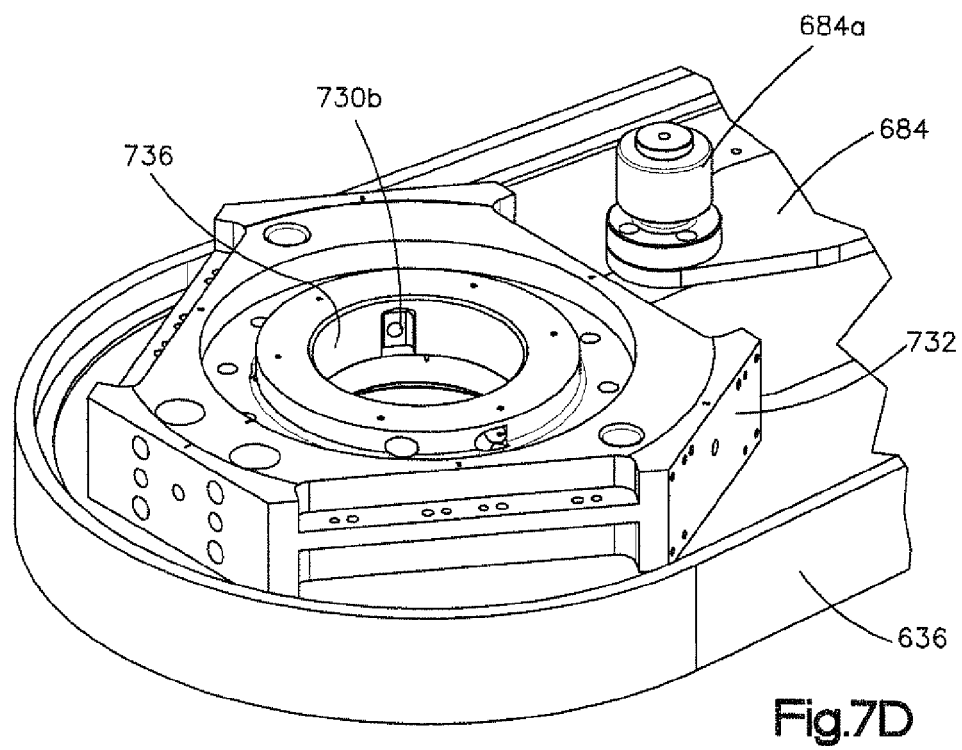

At an inner end of the arm 620a, a fluid pressure operated engagement mechanism indicated generally by the reference character 730 in FIG. 7B is suitably mounted. The engagement mechanism 730 is conventional and is available from Applied Robotics. The gripper/tool changer mechanism 730 is operative to rigidly engage the rim assembly 640 by virtue of an engagement block 732, which is also available from Applied Robotics and which forms part of the bracket 636.

As is known, the gripper mechanism includes a plurality of cam members 730a, which are engageable with slots 730b formed in the engagement block 732. Fluid pressure applied to the actuator 730 causes the cam elements or fingers 730a to move outwardly and engage the slots 730b, thus locking the bracket 636 to the transfer arm 620a.

To engage a bracket 636 in order to couple a rim set assembly 640 to the transfer arm, the transfer mechanism lowers the aligned transfer member 620a until a hub 734 is received by an associated opening 736 formed in the engagement block 732. The gripper mechanism is then energized to extend the fingers 730a into the slots 730b, thereby coupling the bracket 636 to the transfer arm 620a.

FIGS. 8A-8C illustrate the positioning of a rim set assembly 640 on a storage shelf 630. As seen best in FIG. 8B, when a rim set assembly 640 is placed on a shelf, the assembly is supported by a combination of the lower rim 24 resting on a shelf surface and the end of bracket 636 being supported by at least two support stantions 740.

Figure 9A:
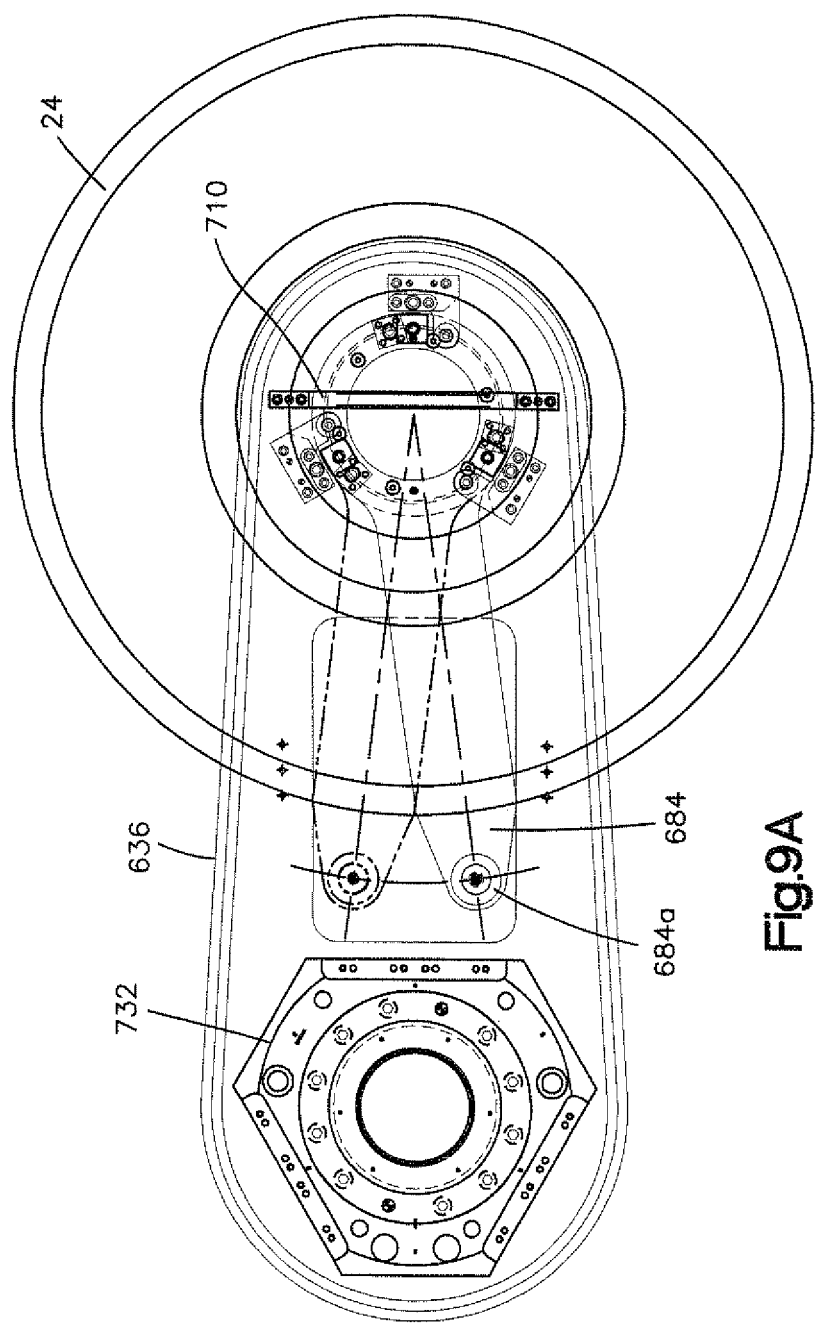
FIG. 9A is a top plan view showing a rim engaged by a bracket that forms part of the rim set assembly.
Figure 9B:
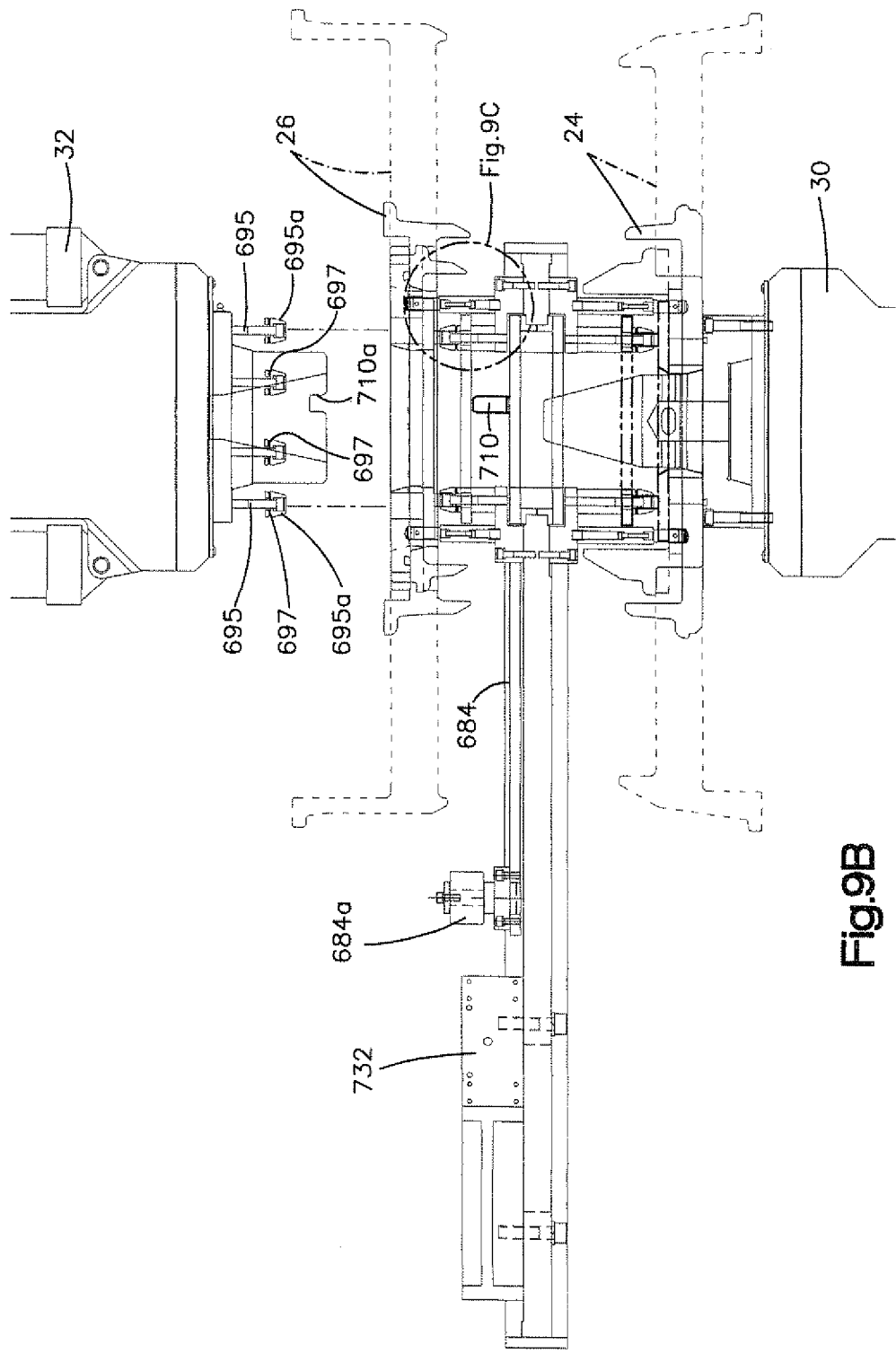
FIG. 9B is a side elevational view showing a rim set assembly held between upper and lower spindles of a tire uniformity machine shown in FIG. 1.
Figure 9C:
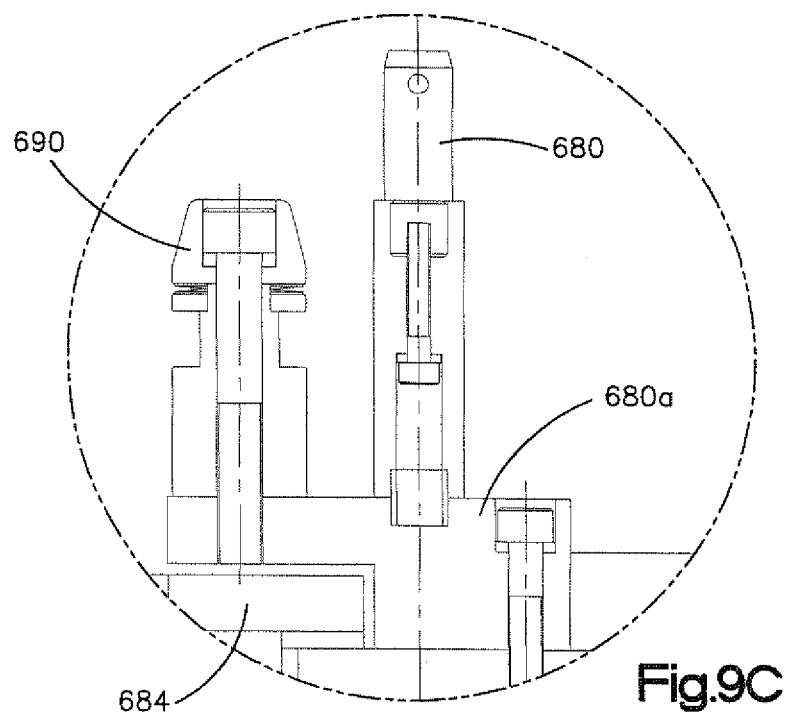
FIGS. 9C and 9D are enlarged views of portions of rim engaging structures.
Figure 9D:
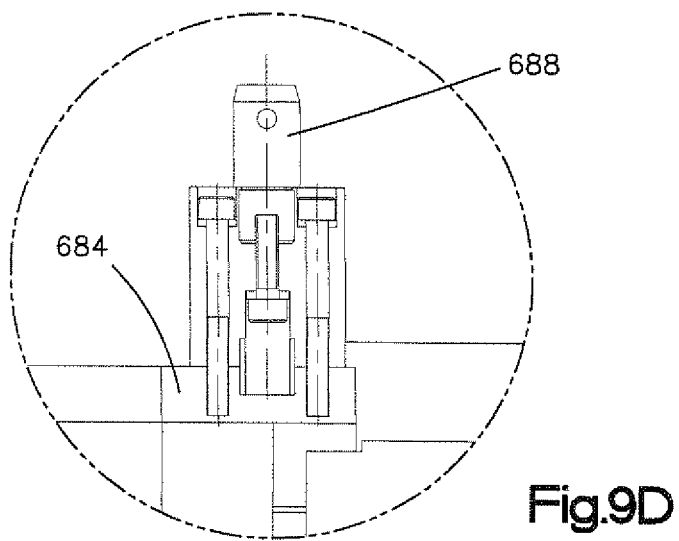

FIG. 9A illustrates the bracket 636 and shows the two extreme positions for the lever arm 684, which rotates the locking members 654 in order to engage and disengage the locking studs 690 associated with each rim or to engage and disengage the rim retaining studs 695 that form part of the upper and lower spindles 32, 30.

FIG. 9B shows the engagement between the upper and lower rims 26, 24 with the upper and lower spindles 32, 30 and with the bracket 636 positioned between the rims. Depending on the position of the lever arm 684 (the extremes of position are shown in FIG. 9A), the rims 24, 26 are either locked to the spindles and released by bracket 636 or locked to the bracket 636 and released simultaneously by the spindles 24, 26. The state of engagement is determined by the position of the lever arm 684.

Figure 10:
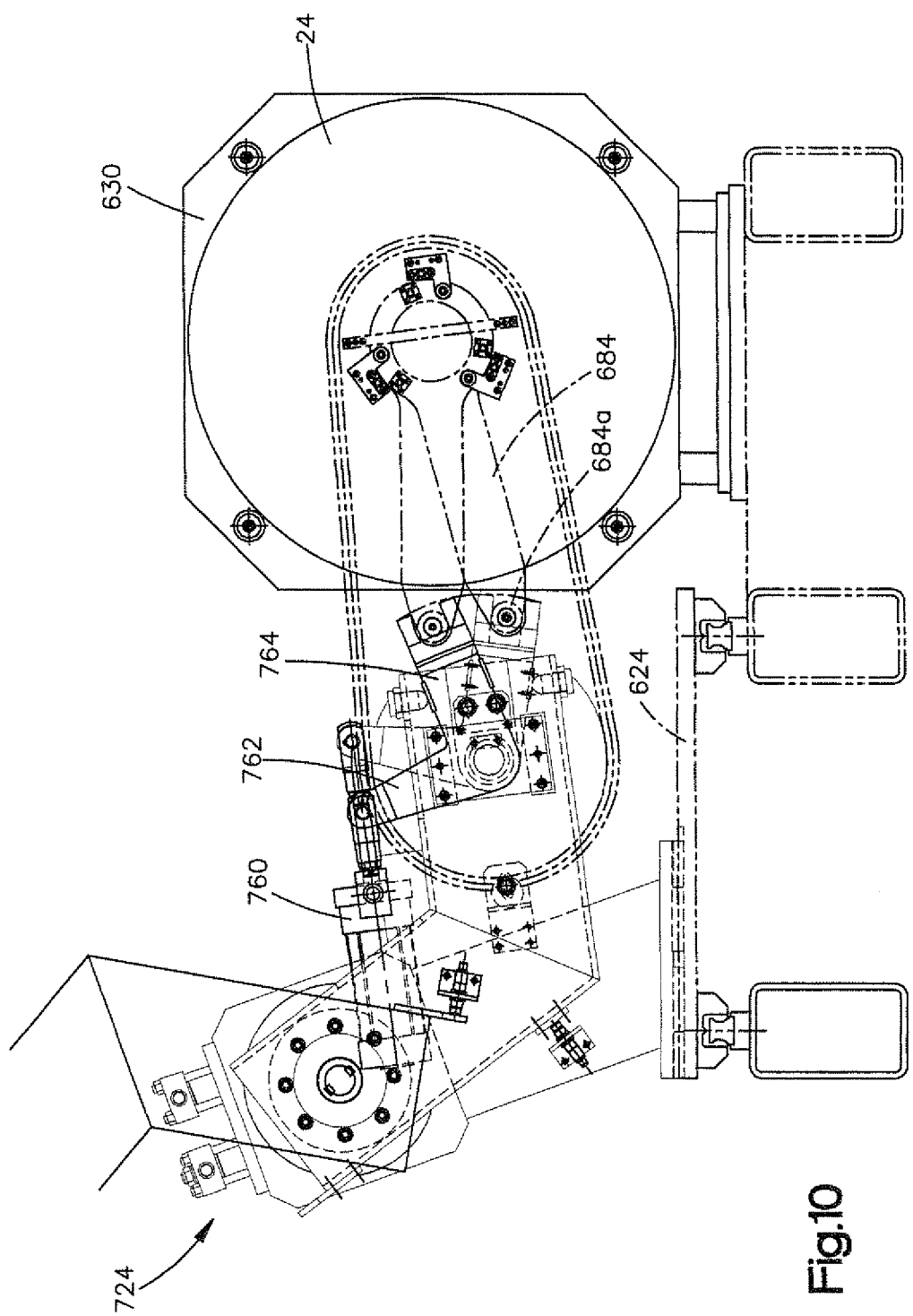
FIG. 10 is another to plan view showing the transfer mechanism and storage unit which form part of the rim change apparatus shown in FIG. 4A.

FIG. 10 is another top plan view of the transfer arm and its relationship to a storage shelf 630. In this illustration, the mechanism for moving the lever arm 684 is shown. As seen in FIG. 10, a fluid pressure operated actuator 760 is connected to a pivot arm that includes a cam roller actuating assembly including interconnected arms 762, 764. The arm 762 is pivotally connected to a piston rod of the fluid pressure operator actuator 760 and the arm 764 includes a slot for receiving the cam roller 684a forming part of the lever arm 684. As seen in FIG. 10, extension and retraction of the fluid pressure operator actuator 760 produces associated movement in the lever arm 684, which moves it between the two extreme positions at which it either locks the locking members 654 to the bracket 636 or locks the locking member 654 to their respective spindles.

The locking rings 654 and the method by which the locking rings are carried by the associated rims can also form an apparatus for facilitating the manual replacement of rims on spindles of a testing station. In order to use the locking members to facilitate manual replacement of the rims, the locking or retaining studs 695, which in the automated version of this invention, form part of the upper and lower spindles, are replaced by threaded bolts or studs that have heads that can fit through the enlarged opening 700b formed on the lower ring 662 of the locking member 654. In order to install a rim onto a spindle, the locking member 654 is rotated manually to a spindle release position and then the rim is placed on the spindle in an orientation that allows the heads of the threaded retaining studs forming part of the spindle to pass through the enlarged openings 700b. If necessary, the retaining studs are loosened so that the underside of the retaining stud heads are above the level of the ring 662. The locking member is then rotated to its spindle engagement position at which the slots 700a move under the retaining stud heads. The studs are then tightened down by the operator to lock the ring 662 and associated rim to the spindle.

Removal of a rim is achieved by simply loosening the threaded retaining studs to allow rotation of the ring 662 until the enlarged openings 700b are aligned with the retaining stud heads which allows the rim to be removed from the spindle.

Although the invention has been described with a certain degree of particularity, it should be understood that those skilled in the art can make various changes to it without departing from the spirit or scope of the invention as hereinafter claimed.

The invention claimed is:

1. For a tire uniformity testing system, an apparatus for changing rim sets at a testing station, comprising:
 a) a storage unit for storing at least one rim set assembly;
   a transfer arm including a gripper mechanism for gripping said rim set assembly; and
   an actuator for moving said rim set assembly from a remote position to a position at which a pair of rims forming part of said rim set assembly are aligned with opposed spindles at said testing station;

b) said rim set assembly, comprising:
  i) a bracket including structure engageable by said transfer arm gripper mechanism;
  ii) at least one of said pair of rims including a locking member rotatably movable between a first position and a second position;
  iii) said bracket including structure for immobilizing said rim to inhibit relative rotation between said rim and said bracket;
  iv) said locking member movable from said first position to said second position in order to engage retaining members forming part of said bracket;
c) other retaining members forming part of at least one of said spindles, said other retaining members operatively engageable by said locking member of said rim when said member is moved from said second position to said first position at which said locking member is coupled to said spindle while simultaneously being released by said bracket in order to secure said rim to said spindle.

2. The apparatus of claim 1 further comprising another locking member associated with the other rim and said bracket includes additional structure for immobilizing said other rim to inhibit relative rotation between said other rim and said bracket when said bracket is placed in abutting engagement with said other rim.

3. The apparatus of claim 1 wherein said remote position is defined by a storage unit.

4. The apparatus of claim 3 wherein said storage unit is configured to store a plurality of rim set assemblies and wherein said transfer arm is mounted for reciprocating vertical movement on said storage unit.

5. The apparatus of claim 4 wherein said storage unit includes four shelves for storing four rim set assemblies.

6. The apparatus of claim 1 wherein said structure for immobilizing said rim comprises at least one stationary pin engageable with an associated opening in said rim when said rim is held by said bracket.

7. The apparatus of claim 1 wherein said locking member is moved from its first to its second position and from its second to its first position by a pivotally mounted lever arm operatively coupled to said locking member such that pivot motion in said lever arm produces rotation in said locking member.

8. The apparatus of claim 7 wherein movement in said lever arm is effected by an actuator forming part of said transfer arm.

9. The apparatus of claim 7 wherein said lever arm is operatively coupled to said locking member by at least one actuating pin that engages an associated opening in said locking member when said locking member engages said bracket.

10. The apparatus of claim 1 wherein said retaining members include spring members for exerting a clamping force on said locking member.

11. For a rim changing apparatus in a tire unit forming a testing system, a rim set assembly, comprising:
  a) a bracket including structure engageable by a transfer arm, said transfer arm for moving said rim set assembly from a test station position and a remote position;
  b) at least one of said rims including a locking member movable between a first position and a second position;
  c) said bracket including structure for immobilizing said rim to inhibit relative rotation between said rim and said bracket and further including a mechanism for moving said locking member from said first position to said second position in order to engage retaining members forming part of said bracket, said locking member movable from said second position to said first position in order to release said rim from said retaining members.

12. The apparatus of claim 11 wherein said rims are coaxially aligned when held by said bracket.

13. The apparatus of claim 12 wherein said locking member comprises a pair of spaced apart rings, one of said rings engageable upon predetermined movement with a spindle forming part of said tire uniformity testing system, the other of said rings engageable upon predetermined movement with said bracket.

14. The apparatus of claim 11 wherein each one of said rims includes said locking member, each of said locking members movable between said first and said second positions.

15. The apparatus of claim 14 wherein said mechanism comprises a lever arm mounted for pivotal movement, having one end defining an axis of rotation coincident with the axes of rotation of said rims, said one end being in operative engagement with said locking members when said rims are held by said bracket and said other end, engageable by a lever arm actuator for producing pivotal motion in said locking member, whereby rotation is imparted to said locking members to move said locking members between said first and second positions.

16. The apparatus of claim 15 wherein said one end of said lever arm includes a hub having actuating pins engageable with associated openings in said locking members whereby pivoting movement in said lever arm produces rotation in said locking member.

17. The apparatus of claim 11 wherein said bracket includes a movement inhibiting member engageable with a spindle forming part of said tire uniformity testing system, whereby rotation of said spindle is inhibited.

18. A method for changing rims on a tire uniformity testing system, comprising the steps of:
  a) forming a rim set assembly by releasably mounting a pair of rims to a bracket;
  b) engaging said rim set assembly and moving it into a predetermined testing station position at which said rims are positioned in axial alignment with spindles forming part of a testing station of said tire uniformity testing system;
  c) moving at least one of said spindles in order to effect abutting contact between each of said rims and an associated spindle;
  d) operating a lock mechanism which releases at least one rim from said bracket while simultaneously engaging an associated spindle; and
  e) upon release of said rims from said bracket, moving said bracket to a position spaced from said testing station.

19. The method of claim 18 wherein said step of moving said rim set assembly to said predetermined position includes the step of engaging said rim assembly with a transfer arm which, upon engagement, translates said rim set assembly from a stowed position to said predetermined testing station position.

20. The method of claim 19 further comprising the step of moving said transfer arm into alignment with a second predetermined position on a storage unit for storing a plurality of rim set assemblies.

21. The method of claim 18 further comprising the steps of:
  a) removing said rims from said associated spindles by:
    i) moving said bracket into alignment with said rims;
    ii) moving at least one of said spindles in order to affect abutting engagement between said rims and said bracket;

iii) operating said lock mechanism in order to rotate said locking members from a spindle engaged position to a spindle release position, said rotation simultaneously causing the engagement of said locking members with said bracket;

iv) moving at least one of said spindles to a spaced position; and v) moving said bracket including attached rims to a position spaced from said testing station.

22. The method of claim 21 further comprising the step of moving said bracket with attached rims to a predetermined position on a storage shelf forming part of said tire uniformity testing system and releasing said bracket so that said bracket and attached rims are left in a predetermined location in said storage unit.

23. The apparatus of claim 18, wherein the pair of rims are releasably mounted to opposite sides of the bracket.

24. A method for attaching a rim to a spindle forming part of a tire uniformity testing system comprising the steps of:

a) attaching a locking member to said rim, said locking member rotatable with respect to said rim and having an axis of rotation coincident with an axis of rotation for said rim when mounted to an associated spindle;

b) moving said locking ring to a rim release position;

c) providing said spindle with retaining members engageable by said locking member;

d) positioning said rim in predetermined alignment with said spindle at which said retaining members enter slotted openings in said locking member; and e) rotating said locking member to a spindle engaging position at which said retaining members are engaged by said slotted openings whereby separation of said rim from said spindle is inhibited.

25. The method of claim 24 further comprising the step of manipulating said retaining members mounted to said spindle in order to increase the retaining force exerted by said retaining members on said locking member.

26. The method of claim 25 wherein said retaining members are threaded retainers and said manipulating step comprises rotating said retaining members in order to tighten said retaining members with respect to said locking member.

27. For a tire uniformity testing system, an apparatus for changing rim sets at a testing station, comprising:

a) a storage unit for storing a plurality of rim set assemblies;

b) a transfer arm mounted for reciprocating vertical movement on said storage unit;

c) said transfer arm including a gripper mechanism for gripping said rim set assembly and including a actuator for pivoting said rim set assembly from a storage position to a position at which rims forming part of said rim set assembly are aligned with opposed spindles at said testing station;

d) said rim assembly, comprising:

i) a bracket including structure engageable by said transfer arm gripper mechanism;

ii) at least one of said rims including a locking member rotatably movable between a first position and a second position;

iii) said bracket including structure for immobilizing said rim to inhibit relative rotation between said rim and said bracket and further including means for moving said locking member from said first position and said second position in order to engage retaining members forming part of said bracket;

e) retaining studs forming part of at least one of said spindles, said retaining studs operatively engageable by said locking member of said rim when said member is moved from said second position to said first position at which said locking member is coupled to said spindle while simultaneously being released by said bracket in order to secure said rim to said spindle.

28. The apparatus of claim 27, wherein the actuator is a rotary actuator.

* * * * *